United States Patent
Thayalan et al.

(10) Patent No.: US 10,581,758 B2
(45) Date of Patent: Mar. 3, 2020

(54) DISTRIBUTED HOT STANDBY LINKS FOR VLAG

(71) Applicant: AVAGO TECHNOLOGIES INTERNATIONAL SALES PTE. LIMITED, Singapore (SG)

(72) Inventors: Prabu Thayalan, Bangalore (IN); Shivalingayya Chikkamath, Bangalore (IN); Mythilikanth Raman, San Jose, CA (US)

(73) Assignee: AVAGO TECHNOLOGIES INTERNATIONAL SALES PTE. LIMITED, Singapore (SG)

( * ) Notice: Subject to any disclaimer, the term of this patent is extended or adjusted under 35 U.S.C. 154(b) by 153 days.

(21) Appl. No.: 14/662,092

(22) Filed: Mar. 18, 2015

(65) Prior Publication Data

US 2015/0271103 A1  Sep. 24, 2015

Related U.S. Application Data

(60) Provisional application No. 61/955,664, filed on Mar. 19, 2014.

(51) Int. Cl.
*H04L 12/709* (2013.01)
*H04L 12/947* (2013.01)
(Continued)

(52) U.S. Cl.
CPC ............ *H04L 49/25* (2013.01); *H04L 45/245* (2013.01); *H04L 49/354* (2013.01); *H04L 45/28* (2013.01); *Y02D 50/30* (2018.01)

(58) Field of Classification Search
None
See application file for complete search history.

(56) References Cited

U.S. PATENT DOCUMENTS

| | | |
|---|---|---|
| 829,529 A | 8/1906 | Keathley |
| 2,854,352 A | 9/1958 | Gronemeyer |
| (Continued) | | |

FOREIGN PATENT DOCUMENTS

| | | |
|---|---|---|
| CN | 1735062 | 2/2006 |
| CN | 1777149 | 5/2006 |
| (Continued) | | |

OTHER PUBLICATIONS

Office Action dated 06/18/215, U.S. Appl. No. 13/098,490, filed May 2, 2011.
(Continued)

*Primary Examiner* — Gregory B Sefcheck
*Assistant Examiner* — Jenkey Van
(74) *Attorney, Agent, or Firm* — Xsensus LLP

(57) ABSTRACT

One embodiment of the present invention provides a switch. The switch includes a link aggregation module adapted to establish a virtual link aggregation group comprising a plurality of links coupling a network device to the switch and one or more other switches. The switch also includes an acknowledgment module adapted to identify an acknowledgment of a notification message from each of the one or more other switches, where the notification message includes port information associated with a local link participating in the virtual link aggregation group. The switch further includes a link selection module adapted to, in response to identifying the acknowledgment from each of the one or more other switches, determine a state for the local link based on the port information, where the state indicates whether the local link is an active link or a standby link for the virtual link aggregation group.

22 Claims, 14 Drawing Sheets

(51) Int. Cl.
H04L 12/931 (2013.01)
H04L 12/703 (2013.01)

(56) References Cited

U.S. PATENT DOCUMENTS

| | | |
|---|---|---|
| 5,390,173 A | 2/1995 | Spinney |
| 5,802,278 A | 9/1998 | Isfeld |
| 5,878,232 A | 3/1999 | Marimuthu |
| 5,879,173 A | 3/1999 | Poplawski |
| 5,959,968 A | 9/1999 | Chin |
| 5,973,278 A | 10/1999 | Wehrill, III |
| 5,983,278 A | 11/1999 | Chong |
| 5,995,262 A | 11/1999 | Hirota |
| 6,041,042 A | 3/2000 | Bussiere |
| 6,085,238 A | 7/2000 | Yuasa |
| 6,092,062 A | 7/2000 | Lohman |
| 6,104,696 A | 8/2000 | Kadambi |
| 6,122,639 A | 9/2000 | Babu |
| 6,185,214 B1 | 2/2001 | Schwartz |
| 6,185,241 B1 | 2/2001 | Sun |
| 6,295,527 B1 | 9/2001 | McCormack |
| 6,331,983 B1 | 12/2001 | Haggerty |
| 6,438,106 B1 | 8/2002 | Pillar |
| 6,498,781 B1 | 12/2002 | Bass |
| 6,542,266 B1 | 4/2003 | Phillips |
| 6,553,029 B1 | 4/2003 | Alexander |
| 6,571,355 B1 | 5/2003 | Linnell |
| 6,583,902 B1 | 6/2003 | Yuen |
| 6,633,761 B1 | 10/2003 | Singhal |
| 6,636,963 B1 | 10/2003 | Stein |
| 6,771,610 B1 | 8/2004 | Seaman |
| 6,816,462 B1 | 11/2004 | Booth, III |
| 6,870,840 B1 | 3/2005 | Hill |
| 6,873,602 B1 | 3/2005 | Ambe |
| 6,920,503 B1 | 7/2005 | Nanji |
| 6,937,576 B1 | 8/2005 | DiBenedetto |
| 6,956,824 B2 | 10/2005 | Mark |
| 6,957,269 B2 | 10/2005 | Williams |
| 6,975,581 B1 | 12/2005 | Medina |
| 6,975,864 B2 | 12/2005 | Singhal |
| 7,016,352 B1 | 3/2006 | Chow |
| 7,061,877 B1 | 6/2006 | Gummalla |
| 7,062,177 B1 | 6/2006 | Grivna |
| 7,097,308 B2 | 8/2006 | Kim et al. |
| 7,173,934 B2 | 2/2007 | Lapuh |
| 7,197,308 B2 | 3/2007 | Singhal |
| 7,206,288 B2 | 4/2007 | Cometto |
| 7,274,694 B1 | 9/2007 | Cheng |
| 7,310,664 B1 | 12/2007 | Merchant |
| 7,313,637 B2 | 12/2007 | Tanaka |
| 7,315,545 B1 | 1/2008 | Chowdhury et al. |
| 7,316,031 B2 | 1/2008 | Griffith |
| 7,330,897 B2 | 2/2008 | Baldwin |
| 7,380,025 B1 | 5/2008 | Riggins |
| 7,397,768 B1 | 7/2008 | Betker |
| 7,397,794 B1 | 7/2008 | Lacroute |
| 7,430,164 B2 | 9/2008 | Bare |
| 7,453,888 B2 | 11/2008 | Zabihi |
| 7,477,894 B1 | 1/2009 | Sinha |
| 7,480,258 B1 | 1/2009 | Shuen |
| 7,508,757 B2 | 3/2009 | Ge |
| 7,558,195 B1 | 7/2009 | Kuo |
| 7,558,273 B1 | 7/2009 | Grosser |
| 7,571,447 B2 | 8/2009 | Ally |
| 7,559,990 B2 | 10/2009 | Mital |
| 7,599,901 B2 | 10/2009 | Mital |
| 7,653,056 B1 | 1/2010 | Dianes |
| 7,688,736 B1 | 3/2010 | Walsh |
| 7,688,960 B1 | 3/2010 | Aubuchon |
| 7,690,040 B2 | 3/2010 | Frattura |
| 7,706,255 B1 | 4/2010 | Kondrat et al. |
| 7,716,370 B1 | 5/2010 | Devarapalli |
| 7,720,076 B2 | 5/2010 | Dobbins |
| 7,729,296 B1 | 6/2010 | Choudhary |
| 7,787,480 B1 | 8/2010 | Mehta |
| 7,792,920 B2 | 9/2010 | Istvan |
| 7,796,593 B1 | 9/2010 | Ghosh |
| 7,801,021 B1 | 9/2010 | Triantafillis |
| 7,808,992 B2 | 10/2010 | Homchaudhuri |
| 7,836,332 B2 | 11/2010 | Hara |
| 7,843,906 B1 | 11/2010 | Chidambaram et al. |
| 7,843,907 B1 | 11/2010 | Abou-Emara |
| 7,860,097 B1 | 12/2010 | Lovett |
| 7,869,432 B1 * | 1/2011 | Mollyn ............... H04L 12/4625 370/389 |
| 7,898,959 B1 | 3/2011 | Arad |
| 7,912,091 B1 | 3/2011 | Krishnan |
| 7,924,837 B1 | 4/2011 | Shabtay |
| 7,937,438 B1 | 5/2011 | Miller |
| 7,937,756 B2 | 5/2011 | Kay |
| 7,945,941 B2 | 5/2011 | Sinha |
| 7,949,638 B1 | 5/2011 | Goodson |
| 7,957,386 B1 | 6/2011 | Aggarwal |
| 8,018,938 B1 | 9/2011 | Fromm |
| 8,027,035 B2 | 9/2011 | Portolani |
| 8,027,354 B1 | 9/2011 | Portolani |
| 8,054,832 B1 | 11/2011 | Shukla |
| 8,068,442 B1 | 11/2011 | Kompella |
| 8,078,704 B2 | 12/2011 | Lee |
| 8,090,805 B1 | 1/2012 | Chawla |
| 8,102,781 B2 | 1/2012 | Smith |
| 8,102,791 B2 | 1/2012 | Smith |
| 8,116,307 B1 | 2/2012 | Thesayi |
| 8,125,928 B2 | 2/2012 | Mehta |
| 8,134,922 B2 | 3/2012 | Elangovan |
| 8,155,150 B1 | 4/2012 | Chung |
| 8,160,063 B2 | 4/2012 | Maltz |
| 8,160,080 B1 | 4/2012 | Arad |
| 8,170,038 B2 | 5/2012 | Belanger |
| 8,175,107 B1 | 5/2012 | Yalagandula |
| 8,095,774 B1 | 6/2012 | Lambeth |
| 8,194,674 B1 | 6/2012 | Pagel |
| 8,195,774 B2 | 6/2012 | Lambeth |
| 8,204,061 B1 | 6/2012 | Sane |
| 8,213,313 B1 | 7/2012 | Doiron |
| 8,213,336 B2 | 7/2012 | Smith |
| 8,230,069 B2 | 7/2012 | Korupolu |
| 8,124,906 B2 | 8/2012 | Raman |
| 8,239,960 B2 | 8/2012 | Frattura |
| 8,249,069 B2 | 8/2012 | Raman |
| 8,270,401 B1 | 9/2012 | Barnes |
| 8,295,291 B1 | 10/2012 | Ramanathan |
| 8,295,921 B2 | 10/2012 | Wang |
| 8,301,686 B1 | 10/2012 | Appajodu |
| 8,339,994 B2 | 12/2012 | Gnanasekaran |
| 8,351,352 B1 | 1/2013 | Eastlake |
| 8,369,335 B2 | 2/2013 | Jha |
| 8,369,347 B2 | 2/2013 | Xiong |
| 8,392,496 B2 | 3/2013 | Linden |
| 8,451,717 B2 | 5/2013 | Srikrishnan |
| 8,462,774 B2 | 6/2013 | Page |
| 8,465,774 B2 | 6/2013 | Page |
| 8,467,375 B2 | 6/2013 | Blair |
| 8,520,595 B2 | 8/2013 | Yadav |
| 8,553,710 B1 | 10/2013 | White |
| 8,595,479 B2 | 11/2013 | Radhakrishnan |
| 8,599,850 B2 | 12/2013 | J Ha |
| 8,599,864 B2 | 12/2013 | Chung |
| 8,615,008 B2 | 12/2013 | Natarajan |
| 8,619,788 B1 | 12/2013 | Sankaran |
| 8,625,616 B2 | 1/2014 | Vobbilisetty |
| 8,705,526 B1 | 4/2014 | Hasan |
| 8,706,905 B1 | 4/2014 | McGlaughlin |
| 8,717,895 B2 | 5/2014 | Koponen |
| 8,724,456 B1 | 5/2014 | Hong |
| 8,792,501 B1 | 7/2014 | Rustagi |
| 8,798,045 B1 | 8/2014 | Aybay |
| 8,798,055 B1 | 8/2014 | An |
| 8,804,732 B1 | 8/2014 | Hepting |
| 8,804,736 B1 | 8/2014 | Drake |
| 8,806,031 B1 | 8/2014 | Kondur |
| 8,826,385 B2 | 9/2014 | Congdon |
| 8,918,631 B1 | 12/2014 | Kumar |
| 8,937,865 B1 | 1/2015 | Kumar |

(56) References Cited

U.S. PATENT DOCUMENTS

| | | |
|---|---|---|
| 8,948,181 B2 | 2/2015 | Kapadia |
| 8,971,173 B1 | 3/2015 | Choudhury |
| 9,019,976 B2 | 4/2015 | Gupta |
| 9,178,793 B1 | 11/2015 | Marlow |
| 9,231,890 B2 | 1/2016 | Vobbilisetty |
| 9,350,680 B2 | 5/2016 | Thayalan |
| 9,401,818 B2 | 7/2016 | Venkatesh |
| 9,438,447 B2 | 9/2016 | Basso |
| 9,450,870 B2 | 9/2016 | Ananthapadmanabha |
| 9,524,173 B2 | 12/2016 | Guntaka |
| 9,626,255 B2 | 4/2017 | Guntaka |
| 9,628,407 B2 | 4/2017 | Guntaka |
| 2001/0005527 A1 | 6/2001 | Vaeth |
| 2001/0055274 A1 | 12/2001 | Hegge |
| 2002/0019904 A1 | 2/2002 | Katz |
| 2002/0021701 A1 | 2/2002 | Lavian |
| 2002/0027885 A1 | 3/2002 | Ben-Ami |
| 2002/0039350 A1 | 4/2002 | Wang |
| 2002/0054593 A1 | 5/2002 | Morohashi |
| 2002/0087723 A1 | 7/2002 | Williams |
| 2002/0091795 A1 | 7/2002 | Yip |
| 2002/0138628 A1 | 9/2002 | Tingley |
| 2002/0161867 A1 | 10/2002 | Cochran |
| 2003/0026290 A1 | 2/2003 | Umayabashi |
| 2003/0041085 A1 | 2/2003 | Sato |
| 2003/0093567 A1 | 5/2003 | Lolayekar |
| 2003/0097464 A1 | 5/2003 | Martinez |
| 2003/0097470 A1 | 5/2003 | Lapuh |
| 2003/0123393 A1 | 7/2003 | Feuerstraeter |
| 2003/0147385 A1 | 8/2003 | Montalvo |
| 2003/0152075 A1 | 8/2003 | Hawthorne |
| 2003/0174706 A1 | 9/2003 | Shankar |
| 2003/0189905 A1 | 10/2003 | Lee |
| 2003/0189930 A1 | 10/2003 | Terrell |
| 2003/0208616 A1 | 11/2003 | Laing |
| 2003/0216143 A1 | 11/2003 | Roese |
| 2003/0223428 A1 | 12/2003 | BlanquerGonzalez |
| 2003/0233534 A1 | 12/2003 | Bernhard |
| 2004/0001433 A1 | 1/2004 | Gram |
| 2004/0003094 A1 | 1/2004 | See |
| 2004/0010600 A1 | 1/2004 | Baldwin |
| 2004/0088668 A1 | 1/2004 | Bornowski |
| 2004/0037295 A1 | 2/2004 | Tanaka |
| 2004/0047349 A1 | 3/2004 | Fujita |
| 2004/0049699 A1 | 3/2004 | Griffith |
| 2004/0057430 A1 | 3/2004 | Paavolainen |
| 2004/0081171 A1 | 4/2004 | Finn |
| 2004/0088437 A1 | 5/2004 | Stimac |
| 2004/0095900 A1 | 5/2004 | Siegel |
| 2004/0117508 A1 | 6/2004 | Shimizu |
| 2004/0120326 A1 | 6/2004 | Yoon |
| 2004/0156313 A1 | 8/2004 | Hofmeister et al. |
| 2004/0165595 A1 | 8/2004 | Holmgren |
| 2004/0165596 A1 | 8/2004 | Garcia |
| 2004/0205234 A1 | 10/2004 | Barrack |
| 2004/0213232 A1 | 10/2004 | Regan |
| 2004/0225725 A1 | 11/2004 | Enomoto |
| 2004/0243673 A1 | 12/2004 | Goyal |
| 2005/0007951 A1 | 1/2005 | Lapuh |
| 2005/0025179 A1 | 2/2005 | McLaggan |
| 2005/0036488 A1 | 2/2005 | Kalkunte |
| 2005/0044199 A1 | 2/2005 | Shiga |
| 2005/0074001 A1 | 4/2005 | Mattes |
| 2005/0094568 A1 | 5/2005 | Judd |
| 2005/0094630 A1 | 5/2005 | Valdevit |
| 2005/0108375 A1 | 5/2005 | Hallak-Stamler |
| 2005/0111352 A1 | 5/2005 | Ho |
| 2005/0122979 A1 | 6/2005 | Gross |
| 2005/0152335 A1 | 7/2005 | Lodha |
| 2005/0157645 A1 | 7/2005 | Rabie et al. |
| 2005/0157751 A1 | 7/2005 | Rabie |
| 2005/0169188 A1 | 8/2005 | Cometto |
| 2005/0195813 A1 | 9/2005 | Ambe |
| 2005/0207423 A1 | 9/2005 | Herbst |
| 2005/0213561 A1 | 9/2005 | Yao |
| 2005/0220096 A1 | 10/2005 | Friskney |
| 2005/0259586 A1 | 11/2005 | Hafid |
| 2005/0265330 A1 | 12/2005 | Suzuki |
| 2005/0265356 A1 | 12/2005 | Kawarai |
| 2005/0278565 A1 | 12/2005 | Frattura |
| 2006/0007869 A1 | 1/2006 | Hirota |
| 2006/0018302 A1 | 1/2006 | Ivaldi |
| 2006/0023707 A1 | 2/2006 | Makishima et al. |
| 2006/0029055 A1 | 2/2006 | Perera |
| 2006/0034292 A1 | 2/2006 | Wakayama |
| 2006/0036648 A1 | 2/2006 | Frey |
| 2006/0036765 A1 | 2/2006 | Weyman |
| 2006/0039366 A1* | 2/2006 | Ghosh .................... H04L 45/00 370/360 |
| 2006/0059163 A1 | 3/2006 | Frattura |
| 2006/0062187 A1 | 3/2006 | Rune |
| 2006/0072550 A1 | 4/2006 | Davis |
| 2006/0083172 A1 | 4/2006 | Jordan |
| 2006/0083254 A1 | 4/2006 | Ge |
| 2006/0093254 A1 | 4/2006 | Ge |
| 2006/0092860 A1 | 5/2006 | Higashitaniguchi |
| 2006/0098589 A1 | 5/2006 | Kreeger |
| 2006/0126511 A1 | 6/2006 | Youn |
| 2006/0140130 A1 | 6/2006 | Kalkunte |
| 2006/0155828 A1 | 7/2006 | Ikeda |
| 2006/0168109 A1 | 7/2006 | Warmenhoven |
| 2006/0184937 A1 | 8/2006 | Abels |
| 2006/0206655 A1 | 9/2006 | Chappell |
| 2006/0209886 A1 | 9/2006 | Silberman |
| 2006/0221960 A1 | 10/2006 | Borgione |
| 2006/0227776 A1 | 10/2006 | Chandrasekaran |
| 2006/0235995 A1 | 10/2006 | Bhatia |
| 2006/0242311 A1 | 10/2006 | Mai |
| 2006/0242398 A1 | 10/2006 | Fontijn |
| 2006/0245439 A1 | 11/2006 | Sajassi |
| 2006/0251067 A1 | 11/2006 | Desanti |
| 2006/0256767 A1 | 11/2006 | Suzuki |
| 2006/0265515 A1 | 11/2006 | Shiga |
| 2006/0285499 A1 | 12/2006 | Tzeng |
| 2006/0291388 A1 | 12/2006 | Amdahl |
| 2006/0291480 A1 | 12/2006 | Cho |
| 2006/0294413 A1 | 12/2006 | Filz |
| 2007/0036178 A1 | 2/2007 | Hares |
| 2007/0053294 A1 | 3/2007 | Ho |
| 2007/0061817 A1 | 3/2007 | Atkinson |
| 2007/0074052 A1 | 3/2007 | Hemmah |
| 2007/0081530 A1 | 4/2007 | Nomura |
| 2007/0083625 A1 | 4/2007 | Chamdani |
| 2007/0086362 A1 | 4/2007 | Kato |
| 2007/0094464 A1 | 4/2007 | Sharma |
| 2007/0097968 A1 | 5/2007 | Du |
| 2007/0098006 A1 | 5/2007 | Parry |
| 2007/0110068 A1 | 5/2007 | Sekiguchi |
| 2007/0116224 A1 | 5/2007 | Burke |
| 2007/0116422 A1 | 5/2007 | Reynolds |
| 2007/0121617 A1 | 5/2007 | Kanekar |
| 2007/0130295 A1 | 6/2007 | Rastogi |
| 2007/0156659 A1 | 7/2007 | Lim |
| 2007/0177525 A1 | 8/2007 | Wijnands |
| 2007/0177597 A1 | 8/2007 | Ju |
| 2007/0183313 A1 | 8/2007 | Narayanan |
| 2007/0183393 A1 | 8/2007 | Boyd |
| 2007/0206762 A1 | 9/2007 | Chandra |
| 2007/0211712 A1 | 9/2007 | Fitch |
| 2007/0220059 A1 | 9/2007 | Lu |
| 2007/0226214 A1 | 9/2007 | Smits |
| 2007/0230472 A1 | 10/2007 | Jesuraj |
| 2007/0238343 A1 | 10/2007 | Velleca |
| 2007/0258449 A1 | 11/2007 | Bennett |
| 2007/0274234 A1 | 11/2007 | Kubota |
| 2007/0280223 A1 | 12/2007 | Pan |
| 2007/0289017 A1 | 12/2007 | Copeland, III |
| 2007/0297406 A1 | 12/2007 | Rooholamini |
| 2008/0052487 A1 | 2/2008 | Akahane |
| 2008/0056135 A1 | 3/2008 | Lee |
| 2008/0056300 A1 | 3/2008 | Williams |
| 2008/0057918 A1 | 3/2008 | Abrant |
| 2008/0065760 A1 | 3/2008 | Damm |
| 2008/0075078 A1 | 3/2008 | Watanabe |

(56) References Cited

U.S. PATENT DOCUMENTS

| | | |
|---|---|---|
| 2008/0080517 A1 | 4/2008 | Roy |
| 2008/0095160 A1 | 4/2008 | Yadav |
| 2008/0101386 A1 | 5/2008 | Gray |
| 2008/0112133 A1 | 5/2008 | Torudbakken |
| 2008/0112400 A1 | 5/2008 | Dunbar et al. |
| 2008/0133760 A1 | 6/2008 | Berkvens |
| 2008/0159260 A1 | 7/2008 | Vobbilisetty |
| 2008/0159277 A1 | 7/2008 | Vobbilisetty |
| 2008/0165705 A1 | 7/2008 | Umayabashi |
| 2008/0172492 A1 | 7/2008 | Raghunath |
| 2008/0181196 A1* | 7/2008 | Regan .................... H04L 45/00 370/351 |
| 2008/0181243 A1 | 7/2008 | Vobbilisetty |
| 2008/0186968 A1 | 8/2008 | Farinacci |
| 2008/0186981 A1 | 8/2008 | Seto |
| 2008/0205377 A1 | 8/2008 | Chao |
| 2008/0219172 A1 | 9/2008 | Mohan |
| 2008/0225852 A1 | 9/2008 | Raszuk |
| 2008/0225853 A1 | 9/2008 | Melman |
| 2008/0228897 A1 | 9/2008 | Ko |
| 2008/0240129 A1 | 10/2008 | Elmeleegy |
| 2008/0253380 A1 | 10/2008 | Cazares |
| 2008/0267179 A1 | 10/2008 | Lavigne |
| 2008/0279196 A1 | 11/2008 | Friskney |
| 2008/0285458 A1 | 11/2008 | Lysne |
| 2008/0285555 A1 | 11/2008 | Ogasahara |
| 2008/0288020 A1 | 11/2008 | Einav |
| 2008/0298248 A1 | 12/2008 | Roeck |
| 2008/0304498 A1 | 12/2008 | Jorgensen |
| 2008/0304519 A1 | 12/2008 | Koenen |
| 2008/0310342 A1 | 12/2008 | Kruys |
| 2009/0022069 A1 | 1/2009 | Khan |
| 2009/0024734 A1 | 1/2009 | Merbach |
| 2009/0037607 A1 | 2/2009 | Farinacci |
| 2009/0037977 A1 | 2/2009 | Gai |
| 2009/0041046 A1 | 2/2009 | Hirata |
| 2009/0042270 A1 | 2/2009 | Shelly |
| 2009/0044270 A1 | 2/2009 | Shelly |
| 2009/0052326 A1 | 2/2009 | Bergamasco |
| 2009/0067422 A1 | 3/2009 | Poppe |
| 2009/0067442 A1 | 3/2009 | Killian |
| 2009/0079560 A1 | 3/2009 | Fries |
| 2009/0080345 A1 | 3/2009 | Gray |
| 2009/0083445 A1 | 3/2009 | Ganga |
| 2009/0092042 A1 | 4/2009 | Yuhara |
| 2009/0092043 A1 | 4/2009 | Lapuh |
| 2009/0094354 A1 | 4/2009 | Rastogi |
| 2009/0106298 A1 | 4/2009 | Furusho |
| 2009/0106405 A1 | 4/2009 | Mazarick |
| 2009/0113408 A1 | 4/2009 | Toeroe |
| 2009/0116381 A1 | 5/2009 | Kanda |
| 2009/0122700 A1 | 5/2009 | Aboba |
| 2009/0129384 A1 | 5/2009 | Regan |
| 2009/0129389 A1 | 5/2009 | DeFretay |
| 2009/0138577 A1 | 5/2009 | Casado |
| 2009/0138752 A1 | 5/2009 | Graham |
| 2009/0144720 A1 | 6/2009 | Roush |
| 2009/0161584 A1 | 6/2009 | Guan |
| 2009/0161670 A1 | 6/2009 | Shepherd |
| 2009/0168647 A1 | 7/2009 | Holness |
| 2009/0199177 A1 | 8/2009 | Edwards |
| 2009/0204965 A1 | 8/2009 | Tanaka |
| 2009/0213783 A1 | 8/2009 | Moreton |
| 2009/0213867 A1 | 8/2009 | Devireddy |
| 2009/0222879 A1 | 9/2009 | Kostal |
| 2009/0225752 A1 | 9/2009 | Mitsumori |
| 2009/0232031 A1 | 9/2009 | Vasseur |
| 2009/0245112 A1 | 10/2009 | Okazaki |
| 2009/0245137 A1 | 10/2009 | Hares |
| 2009/0245242 A1 | 10/2009 | Carlson |
| 2009/0246137 A1 | 10/2009 | Hadida |
| 2009/0249444 A1 | 10/2009 | Macauley |
| 2009/0252049 A1 | 10/2009 | Ludwig |
| 2009/0252061 A1 | 10/2009 | Small |
| 2009/0252503 A1 | 10/2009 | Ishigami |
| 2009/0260083 A1 | 10/2009 | Szeto |
| 2009/0279558 A1 | 11/2009 | Davis |
| 2009/0279701 A1 | 11/2009 | Moisand |
| 2009/0292858 A1 | 11/2009 | Lambeth |
| 2009/0316721 A1 | 12/2009 | Kanda |
| 2009/0323698 A1 | 12/2009 | LeFaucheur |
| 2009/0323708 A1 | 12/2009 | Ihle |
| 2009/0327392 A1 | 12/2009 | Tripathi |
| 2009/0327462 A1 | 12/2009 | Adams |
| 2010/0002382 A1 | 1/2010 | Aybay |
| 2010/0027420 A1 | 2/2010 | Smith |
| 2010/0027429 A1 | 2/2010 | Jorgens |
| 2010/0042869 A1 | 2/2010 | Szabo |
| 2010/0046471 A1 | 2/2010 | Hattori |
| 2010/0054260 A1 | 3/2010 | Pandey |
| 2010/0061269 A1 | 3/2010 | Banerjee |
| 2010/0074175 A1 | 3/2010 | Banks |
| 2010/0085981 A1 | 4/2010 | Gupta |
| 2010/0097941 A1 | 4/2010 | Carlson |
| 2010/0103813 A1 | 4/2010 | Allan |
| 2010/0103939 A1 | 4/2010 | Carlson |
| 2010/0114818 A1 | 5/2010 | Lier |
| 2010/0131636 A1 | 5/2010 | Suri |
| 2010/0157844 A1 | 6/2010 | Casey |
| 2010/0158024 A1 | 6/2010 | Sajassi |
| 2010/0165877 A1 | 7/2010 | Shukla |
| 2010/0165995 A1 | 7/2010 | Mehta |
| 2010/0168467 A1 | 7/2010 | Johnston |
| 2010/0169467 A1 | 7/2010 | Shukla |
| 2010/0169948 A1 | 7/2010 | Budko |
| 2010/0182920 A1 | 7/2010 | Matsuoka |
| 2010/0189119 A1 | 7/2010 | Sawada |
| 2010/0192225 A1 | 7/2010 | Ma |
| 2010/0195489 A1 | 8/2010 | Zhou |
| 2010/0195529 A1 | 8/2010 | Liu |
| 2010/0214913 A1 | 8/2010 | Kompella |
| 2010/0215042 A1 | 8/2010 | Sato |
| 2010/0215049 A1 | 8/2010 | Raza |
| 2010/0220724 A1 | 9/2010 | Rabie |
| 2010/0226368 A1 | 9/2010 | Mack-Crane |
| 2010/0226381 A1 | 9/2010 | Mehta |
| 2010/0246388 A1 | 9/2010 | Gupta |
| 2010/0246580 A1 | 9/2010 | Kaganoi |
| 2010/0254703 A1 | 10/2010 | Kirkpatrick |
| 2010/0257263 A1 | 10/2010 | Casado |
| 2010/0258263 A1 | 10/2010 | Douxchamps |
| 2010/0265849 A1 | 10/2010 | Harel |
| 2010/0271960 A1 | 10/2010 | Krygowski |
| 2010/0272107 A1 | 10/2010 | Papp |
| 2010/0281106 A1 | 11/2010 | Ashwood-Smith |
| 2010/0284414 A1 | 11/2010 | Agarwal |
| 2010/0284418 A1 | 11/2010 | Gray |
| 2010/0284698 A1 | 11/2010 | McColloch |
| 2010/0287262 A1 | 11/2010 | Elzur |
| 2010/0287548 A1 | 11/2010 | Zhou |
| 2010/0290464 A1 | 11/2010 | Assarpour |
| 2010/0290472 A1* | 11/2010 | Raman .................... H04L 45/00 370/395.2 |
| 2010/0290473 A1 | 11/2010 | Enduri |
| 2010/0299527 A1 | 11/2010 | Arunan |
| 2010/0303071 A1 | 12/2010 | Kotalwar |
| 2010/0303075 A1 | 12/2010 | Tripathi |
| 2010/0303083 A1 | 12/2010 | Belanger |
| 2010/0309820 A1 | 12/2010 | Rajagopalan |
| 2010/0309912 A1 | 12/2010 | Mehta |
| 2010/0316055 A1 | 12/2010 | Belanger |
| 2010/0329110 A1 | 12/2010 | Rose |
| 2010/0329265 A1 | 12/2010 | Lapuh |
| 2011/0007738 A1 | 1/2011 | Berman |
| 2011/0019678 A1 | 1/2011 | Mehta |
| 2011/0032945 A1 | 2/2011 | Mullooly |
| 2011/0035489 A1 | 2/2011 | McDaniel |
| 2011/0035498 A1 | 2/2011 | Shah |
| 2011/0044339 A1 | 2/2011 | Kotalwar |
| 2011/0044352 A1 | 2/2011 | Chaitou |
| 2011/0051723 A1 | 3/2011 | Rabie |
| 2011/0058547 A1 | 3/2011 | Waldrop |
| 2011/0064086 A1 | 3/2011 | Xiong |
| 2011/0064089 A1 | 3/2011 | Hidaka |

(56) References Cited

U.S. PATENT DOCUMENTS

| | | |
|---|---|---|
| 2011/0072208 A1 | 3/2011 | Gulati |
| 2011/0085557 A1 | 4/2011 | Gnanasekaran |
| 2011/0085560 A1 | 4/2011 | Chawla |
| 2011/0085562 A1 | 4/2011 | Bao |
| 2011/0085563 A1 | 4/2011 | Kotha |
| 2011/0088011 A1 | 4/2011 | Ouali |
| 2011/0110266 A1 | 5/2011 | Li |
| 2011/0134802 A1 | 6/2011 | Rajagopalan |
| 2011/0134803 A1 | 6/2011 | Dalvi |
| 2011/0134924 A1 | 6/2011 | Hewson |
| 2011/0134925 A1 | 6/2011 | Safrai |
| 2011/0142053 A1 | 6/2011 | Van |
| 2011/0142062 A1 | 6/2011 | Wang |
| 2011/0149526 A1 | 6/2011 | Turner |
| 2011/0158113 A1 | 6/2011 | Nanda |
| 2011/0161494 A1 | 6/2011 | McDysan |
| 2011/0161695 A1 | 6/2011 | Okita |
| 2011/0176412 A1 | 7/2011 | Stine |
| 2011/0188373 A1 | 8/2011 | Saito |
| 2011/0194403 A1 | 8/2011 | Sajassi |
| 2011/0194563 A1 | 8/2011 | Shen |
| 2011/0225540 A1 | 9/2011 | d'Entremont |
| 2011/0228767 A1 | 9/2011 | Singla |
| 2011/0228780 A1 | 9/2011 | Ashwood-Smith |
| 2011/0231570 A1 | 9/2011 | Altekar |
| 2011/0231574 A1 | 9/2011 | Saunderson |
| 2011/0235523 A1 | 9/2011 | Jha |
| 2011/0243133 A9 | 10/2011 | Villait |
| 2011/0243136 A1 | 10/2011 | Raman |
| 2011/0246669 A1 | 10/2011 | Kanada |
| 2011/0255538 A1 | 10/2011 | Srinivasan |
| 2011/0255540 A1 | 10/2011 | Mizrahi |
| 2011/0261828 A1 | 10/2011 | Smith |
| 2011/0268118 A1 | 11/2011 | Schlansker |
| 2011/0268120 A1 | 11/2011 | Vobbilisetty |
| 2011/0268125 A1 | 11/2011 | Vobbilisetty |
| 2011/0273988 A1 | 11/2011 | Tourrilhes |
| 2011/0273990 A1 | 11/2011 | Rajagopalan |
| 2011/0274114 A1 | 11/2011 | Dhar |
| 2011/0280572 A1 | 11/2011 | Vobbilisetty |
| 2011/0286357 A1 | 11/2011 | Haris |
| 2011/0286457 A1 | 11/2011 | Ee |
| 2011/0286462 A1 | 11/2011 | Kompella |
| 2011/0055274 A1 | 12/2011 | Hegge |
| 2011/0292947 A1 | 12/2011 | Vobbilisetty |
| 2011/0296052 A1 | 12/2011 | Guo |
| 2011/0299391 A1* | 12/2011 | Vobbilisetty .......... H04L 45/586 370/230.1 |
| 2011/0299413 A1 | 12/2011 | Chatwani |
| 2011/0299414 A1 | 12/2011 | Yu |
| 2011/0299527 A1 | 12/2011 | Yu |
| 2011/0299528 A1 | 12/2011 | Yu |
| 2011/0299531 A1 | 12/2011 | Yu |
| 2011/0299532 A1 | 12/2011 | Yu |
| 2011/0299533 A1 | 12/2011 | Yu |
| 2011/0299534 A1 | 12/2011 | Koganti |
| 2011/0299535 A1* | 12/2011 | Vobbilisetty ........ H04L 12/4625 370/392 |
| 2011/0299536 A1 | 12/2011 | Cheng |
| 2011/0317559 A1 | 12/2011 | Kern |
| 2011/0317703 A1 | 12/2011 | Dunbar et al. |
| 2012/0011240 A1 | 1/2012 | Hara |
| 2012/0014261 A1 | 1/2012 | Salam |
| 2012/0014387 A1 | 1/2012 | Dunbar |
| 2012/0020220 A1 | 1/2012 | Sugita |
| 2012/0027017 A1 | 2/2012 | Rai |
| 2012/0033663 A1 | 2/2012 | Guichard |
| 2012/0033665 A1 | 2/2012 | Jacob |
| 2012/0033668 A1 | 2/2012 | Humphries |
| 2012/0033669 A1 | 2/2012 | Mohandas |
| 2012/0033672 A1 | 2/2012 | Page |
| 2012/0039163 A1 | 2/2012 | Nakajima |
| 2012/0042095 A1 | 2/2012 | Kotha |
| 2012/0063363 A1 | 3/2012 | Li |
| 2012/0075991 A1 | 3/2012 | Sugita |
| 2012/0099567 A1 | 4/2012 | Hart |
| 2012/0099602 A1 | 4/2012 | Nagapudi |
| 2012/0099863 A1 | 4/2012 | Xu |
| 2012/0102160 A1 | 4/2012 | Breh |
| 2012/0106339 A1 | 5/2012 | Mishra |
| 2012/0117438 A1 | 5/2012 | Shaffer |
| 2012/0131097 A1 | 5/2012 | Baykal |
| 2012/0131289 A1 | 5/2012 | Taguchi |
| 2012/0134266 A1 | 5/2012 | Roitshtein |
| 2012/0136999 A1 | 5/2012 | Roitshtein |
| 2012/0147740 A1 | 6/2012 | Nakash |
| 2012/0158997 A1 | 6/2012 | Hsu |
| 2012/0163164 A1 | 6/2012 | Terry |
| 2012/0170491 A1 | 7/2012 | Kern |
| 2012/0177039 A1 | 7/2012 | Berman |
| 2012/0210416 A1 | 8/2012 | Mihelich |
| 2012/0221636 A1 | 8/2012 | Surtani |
| 2012/0230225 A1 | 9/2012 | Matthews |
| 2012/0239918 A1 | 9/2012 | Huang |
| 2012/0243359 A1 | 9/2012 | Keesara |
| 2012/0243539 A1 | 9/2012 | Keesara |
| 2012/0250502 A1 | 10/2012 | Brolin |
| 2012/0260079 A1 | 10/2012 | Mruthyunjaya |
| 2012/0275297 A1 | 11/2012 | Subramanian |
| 2012/0275347 A1 | 11/2012 | Banerjee |
| 2012/0278804 A1 | 11/2012 | Narayanasamy |
| 2012/0281700 A1 | 11/2012 | Koganti |
| 2012/0287785 A1 | 11/2012 | Kamble |
| 2012/0294192 A1 | 11/2012 | Masood |
| 2012/0294194 A1 | 11/2012 | Balasubramanian |
| 2012/0230800 A1 | 12/2012 | Kamble |
| 2012/0320800 A1 | 12/2012 | Kamble |
| 2012/0320926 A1 | 12/2012 | Kamath et al. |
| 2012/0327766 A1 | 12/2012 | Tsai et al. |
| 2012/0327937 A1 | 12/2012 | Melman et al. |
| 2013/0003535 A1 | 1/2013 | Sarwar |
| 2013/0003549 A1 | 1/2013 | Matthews |
| 2013/0003608 A1 | 1/2013 | Lei |
| 2013/0003737 A1 | 1/2013 | Sinicrope |
| 2013/0003738 A1 | 1/2013 | Koganti |
| 2013/0003747 A1 | 1/2013 | Raman |
| 2013/0016606 A1 | 1/2013 | Cirkovic |
| 2013/0028072 A1 | 1/2013 | Addanki |
| 2013/0034015 A1 | 2/2013 | Jaiswal |
| 2013/0034021 A1 | 2/2013 | Jaiswal |
| 2013/0034094 A1 | 2/2013 | Cardona |
| 2013/0044629 A1 | 2/2013 | Biswas |
| 2013/0058354 A1 | 3/2013 | Casado |
| 2013/0066947 A1 | 3/2013 | Ahmad |
| 2013/0067466 A1 | 3/2013 | Combs |
| 2013/0070762 A1 | 3/2013 | Adams |
| 2013/0083693 A1 | 4/2013 | Himura |
| 2013/0097345 A1 | 4/2013 | Munoz |
| 2013/0114595 A1 | 5/2013 | Mack-Crane et al. |
| 2013/0121142 A1 | 5/2013 | Bai |
| 2013/0124707 A1 | 5/2013 | Ananthapadmanabha |
| 2013/0124750 A1 | 5/2013 | Anumala |
| 2013/0127848 A1 | 5/2013 | Joshi |
| 2013/0132296 A1 | 5/2013 | Manfred |
| 2013/0135811 A1 | 5/2013 | Dunwoody |
| 2013/0136123 A1 | 5/2013 | Ge |
| 2013/0145008 A1 | 6/2013 | Kannan |
| 2013/0148546 A1 | 6/2013 | Eisenhauer |
| 2013/0148663 A1 | 6/2013 | Xiong |
| 2013/0156425 A1 | 6/2013 | Kirkpatrick |
| 2013/0163591 A1 | 6/2013 | Shukla |
| 2013/0194914 A1 | 8/2013 | Agarwal |
| 2013/0201992 A1 | 8/2013 | Masaki |
| 2013/0215754 A1 | 8/2013 | Tripathi |
| 2013/0219473 A1 | 8/2013 | Schaefer |
| 2013/0223221 A1 | 8/2013 | Xu |
| 2013/0223438 A1 | 8/2013 | Tripathi |
| 2013/0223449 A1 | 8/2013 | Koganti |
| 2013/0238802 A1 | 9/2013 | Sarikaya |
| 2013/0250947 A1 | 9/2013 | Zheng |
| 2013/0250951 A1 | 9/2013 | Koganti |
| 2013/0250958 A1 | 9/2013 | Watanabe |
| 2013/0259037 A1 | 10/2013 | Natarajan |
| 2013/0266015 A1 | 10/2013 | Qu |

(56) References Cited

U.S. PATENT DOCUMENTS

| | | |
|---|---|---|
| 2013/0268590 A1 | 10/2013 | Mahadevan |
| 2013/0272135 A1 | 10/2013 | Leong |
| 2013/0294451 A1 | 11/2013 | Li |
| 2013/0297757 A1 | 11/2013 | Han |
| 2013/0301425 A1 | 11/2013 | Chandra |
| 2013/0301642 A1 | 11/2013 | Radhakrishnan |
| 2013/0308492 A1 | 11/2013 | Baphna |
| 2013/0308641 A1 | 11/2013 | Ackley |
| 2013/0308647 A1 | 11/2013 | Rosset |
| 2013/0315125 A1 | 11/2013 | Ravishankar |
| 2013/0315246 A1 | 11/2013 | Zhang |
| 2013/0315586 A1 | 11/2013 | Kipp |
| 2013/0322427 A1 | 12/2013 | Stiekes |
| 2013/0329605 A1 | 12/2013 | Nakil |
| 2013/0332660 A1 | 12/2013 | Talagala |
| 2013/0336104 A1 | 12/2013 | Talla |
| 2013/0346583 A1 | 12/2013 | Low |
| 2014/0010239 A1 | 1/2014 | Xu |
| 2014/0013324 A1 | 1/2014 | Zhang |
| 2014/0019608 A1 | 1/2014 | Kawakami |
| 2014/0019639 A1 | 1/2014 | Ueno |
| 2014/0025736 A1 | 1/2014 | Wang |
| 2014/0029412 A1 | 1/2014 | Janardhanan |
| 2014/0029419 A1 | 1/2014 | Jain |
| 2014/0044126 A1 | 2/2014 | Sabhanatarajan |
| 2014/0050223 A1 | 2/2014 | Foo |
| 2014/0056298 A1 | 2/2014 | Vobbilisetty |
| 2014/0059225 A1 | 2/2014 | Gasparakis |
| 2014/0064056 A1 | 3/2014 | Sakata |
| 2014/0071987 A1 | 3/2014 | Janardhanan |
| 2014/0086253 A1 | 3/2014 | Yong |
| 2014/0092738 A1 | 4/2014 | Grandhi |
| 2014/0105034 A1 | 4/2014 | Huawei |
| 2014/0112122 A1 | 4/2014 | Kapadia |
| 2014/0140243 A1 | 5/2014 | Ashwood-Smith |
| 2014/0157251 A1 | 6/2014 | Hocker |
| 2014/0169368 A1 | 6/2014 | Grover |
| 2014/0188996 A1 | 7/2014 | Lie |
| 2014/0192804 A1 | 7/2014 | Ghanwani |
| 2014/0195695 A1 | 7/2014 | Okita |
| 2014/0241147 A1* | 8/2014 | Rajagopalan ......... H04L 45/245 370/221 |
| 2014/0258446 A1 | 9/2014 | Bursell |
| 2014/0269701 A1 | 9/2014 | Kaushik |
| 2014/0269709 A1 | 9/2014 | Benny |
| 2014/0269720 A1 | 9/2014 | Srinivasan |
| 2014/0269733 A1 | 9/2014 | Venkatesh |
| 2014/0298091 A1 | 10/2014 | Carlen |
| 2014/0348168 A1 | 11/2014 | Singh |
| 2014/0355477 A1 | 12/2014 | Moopath |
| 2014/0362854 A1 | 12/2014 | Addanki |
| 2014/0362859 A1 | 12/2014 | Addanki |
| 2014/0376550 A1 | 12/2014 | Khan |
| 2015/0009992 A1 | 1/2015 | Zhang |
| 2015/0010007 A1 | 1/2015 | Matsuhira |
| 2015/0016300 A1 | 1/2015 | Devireddy |
| 2015/0030031 A1 | 1/2015 | Zhou |
| 2015/0092593 A1 | 4/2015 | Kompella |
| 2015/0103826 A1 | 4/2015 | Davis |
| 2015/0110111 A1 | 4/2015 | Song |
| 2015/0110487 A1 | 4/2015 | Fenkes |
| 2015/0117256 A1 | 4/2015 | Sabaa |
| 2015/0117454 A1 | 4/2015 | Koponen |
| 2015/0127618 A1 | 5/2015 | Alberti |
| 2015/0139234 A1 | 5/2015 | Hu |
| 2015/0143369 A1 | 5/2015 | Zheng |
| 2015/0172098 A1 | 6/2015 | Agarwal |
| 2015/0188753 A1 | 7/2015 | Anumala |
| 2015/0188770 A1 | 7/2015 | Naiksatam |
| 2015/0195093 A1 | 7/2015 | Ramasubramani |
| 2015/0222506 A1 | 8/2015 | Kizhakkiniyil |
| 2015/0248298 A1 | 9/2015 | Gavrilov |
| 2015/0263897 A1 | 9/2015 | Ganichev |
| 2015/0263899 A1 | 9/2015 | Tubaltsev |
| 2015/0263991 A1 | 9/2015 | MacChiano |
| 2015/0281066 A1 | 10/2015 | Koley |
| 2015/0301901 A1 | 10/2015 | Rath |
| 2015/0347468 A1 | 12/2015 | Bester |
| 2016/0072899 A1 | 3/2016 | Tung |
| 2016/0087885 A1 | 3/2016 | Tripathi |
| 2016/0139939 A1 | 5/2016 | Bosch |
| 2016/0182458 A1 | 6/2016 | Shatzkamer |
| 2016/0212040 A1 | 7/2016 | Bhagavathiperumal |
| 2016/0344640 A1 | 11/2016 | Söderlund |
| 2017/0012880 A1 | 1/2017 | Yang |
| 2017/0026197 A1 | 1/2017 | Venkatesh |
| 2017/0097841 A1 | 4/2017 | Chang |
| 2018/0013614 A1 | 1/2018 | Vobbilisetty |

FOREIGN PATENT DOCUMENTS

| | | |
|---|---|---|
| CN | 101064682 | 10/2007 |
| CN | 101459618 | 6/2009 |
| CN | 101471899 | 7/2009 |
| CN | 101548511 | 9/2009 |
| CN | 101645880 | 2/2010 |
| CN | 102098237 | 6/2011 |
| CN | 102148749 | 8/2011 |
| CN | 102301663 | 12/2011 |
| CN | 102349268 | 2/2012 |
| CN | 102378176 | 3/2012 |
| CN | 102404181 | 4/2012 |
| CN | 102415065 | 4/2012 |
| CN | 102415065 A | 4/2012 |
| CN | 102801599 | 11/2012 |
| CN | 102801599 A | 11/2012 |
| CN | 102088388 | 4/2014 |
| EP | 0579567 | 5/1993 |
| EP | 0579567 A2 | 1/1994 |
| EP | 0993156 | 4/2000 |
| EP | 0993156 A2 | 12/2000 |
| EP | 1398920 | 3/2004 |
| EP | 1398920 A2 | 3/2004 |
| EP | 2001167 A1 | 8/2007 |
| EP | 1916807 A2 | 4/2008 |
| EP | 2854352 | 4/2015 |
| EP | 2874359 | 5/2015 |
| WO | 2008056838 | 5/2008 |
| WO | 2009042919 | 4/2009 |
| WO | 2010111142 | 9/2010 |
| WO | 2010111142 A1 | 9/2010 |
| WO | 2011132568 | 10/2011 |
| WO | 2011140028 | 11/2011 |
| WO | 2011140028 A1 | 11/2011 |
| WO | 2012033663 | 3/2012 |
| WO | 2012093429 | 7/2012 |
| WO | 2014031781 | 2/2014 |

OTHER PUBLICATIONS

Office Action dated Jun. 16, 2015, U.S. Appl. No. 13/048,817, filed Mar. 15, 2011.

Touch, J. et al., 'Transparent Interconnection of Lots of Links (TRILL): Problem and Applicability Statement', May 2009, Network Working Group, pp. 1-17.

Zhai F. Hu et al. 'RBridge: Pseudo-Nickname; draft-hu-trill-pseudonode-nickname-02.txt', May 15, 2012.

Office Action dated Jul. 31, 2015, U.S. Appl. No. 13/598,204, filed Aug. 29, 2014.

Office Action dated Jul. 31, 2015, U.S. Appl. No. 14/473,941, filed Aug. 29, 2014.

Office Action dated Jul. 31, 2015, U.S. Appl. No. 14/488,173, filed Sep. 16, 2014.

Office Action dated Aug. 21, 2015, U.S. Appl. No. 13/776,217, filed Feb. 25, 2013.

Office Action dated Aug. 19, 2015, U.S. Appl. No. 14/156,374, filed Jan. 15, 2014.

Office Action dated Sep. 2, 2015, U.S. Appl. No. 14/151,693, filed Jan. 9, 2014.

Office Action dated Sep. 17, 2015, U.S. Appl. No. 14/577,785, filed Dec. 19, 2014.

(56) References Cited

OTHER PUBLICATIONS

Office Action dated Sep. 22, 2015 U.S. Appl. No. 13/656,438, filed Oct. 19, 2012.
Office Action dated Nov. 5, 2015, U.S. Appl. No. 14/178,042, filed Feb. 11, 2014.
Office Action dated Oct. 19, 2015, U.S. Appl. No. 14/215,996, filed Mar. 17, 2014.
Office Action dated Sep. 18, 2015, U.S. Appl. No. 13/345,566, filed Jan. 6, 2012.
Open Flow Switch Specification Version 1.1.0, Feb. 28, 2011.
Open Flow Switch Specification Version 1.0.0, Dec. 31, 2009.
Open Flow Configuration and Management Protocol 1.0 (OF-Config 1.0) Dec. 23, 2011.
Open Flow Switch Specification Version 1.2 Dec. 5, 2011.
Office action dated Feb. 2, 2016, U.S. Appl. No. 13/092,460, filed Apr. 22, 2011.
Office Action dated Feb. 2, 2016. U.S. Appl. No. 14/154,106, filed Jan. 13, 2014.
Office Action dated Feb. 3, 2016, U.S. Appl. No. 13/098,490, filed May 2, 2011.
Office Action dated Feb. 4, 2016, U.S. Appl. No. 13/557,105, filed Jul. 24, 2012.
Office Action dated Feb. 11, 2016, U.S. Appl. No. 14/488,173, filed Sep. 16, 2014.
Office Action dated Feb. 24, 2016, U.S. Appl. No. 13/971,397, filed Aug. 20, 2013.
Office Action dated Feb. 24, 2016, U.S. Appl. No. 12/705,508, filed Feb. 12, 2010.
Office Action dated Jul. 6, 2016, U.S. Appl. No. 14/618,941, filed Feb. 10, 2015.
Office Action dated Jul. 20, 2016, U.S. Appl. No. 14/510,913, filed Oct. 9, 2014.
Office Action dated Jul. 29, 2016, U.S. Appl. No. 14/473,941, filed Aug. 29, 2014.
Office Action dated Jul. 28, 2016, U.S. Appl. No. 14/284,212, filed May 21, 2016.
Office Action dated Jan. 31, 2017, U.S. Appl. No. 13/184,526, filed Jul. 16, 2011.
Office Action dated Jan. 27, 2017, U.S. Appl. No. 14/216,292, filed Mar. 17, 2014.
Office Action dated Jan. 26, 2017, U.S. Appl. No. 13/786,328, filed Mar. 5, 2013.
Office Action dated Dec. 2, 2016, U.S. Appl. No. 14/512,268, filed Oct. 10, 2014.
Office Action dated Dec. 1, 2016, U.S. Appl. No. 13/899,849, filed May 22, 2013.
Office Action dated Dec. 1, 2016, U.S. Appl. No. 13/656,438, filed Oct. 19, 2012.
Office Action dated Nov. 30, 2016, U.S. Appl. No. 13/598,204, filed Aug. 29, 2012.
Office Action dated Nov. 21, 2016, U.S. Appl. No. 13/669,357, filed Nov. 5, 2012.
Office Action dated Feb. 8, 2017, U.S. Appl. No. 14/473,941, filed Aug. 29, 2014.
Office Action dated Feb. 8, 2017, U.S. Appl. No. 14/822,380, filed Aug. 10, 2015.
Mahalingam "VXLAN: A Framework for Overlaying Virtualized Layer 2 Networks over Layer 3 Networks" Oct. 17, 2013 pp. 1-22, Sections 1, 4 and 4.1.
Office action dated Apr. 30, 2015, U.S. Appl. No. 13/351,513, filed Jan. 17, 2012.
Office Action dated Apr. 1, 2015, U.S. Appl. No. 13/656,438, filed Oct. 19, 2012.
Office Action dated May 21, 2015, U.S. Appl. No. 13/288,822, filed Nov. 3, 2011.
Siamak Azodolmolky et al. "Cloud computing networking: Challenges and opportunities for innovations", IEEE Communications Magazine, vol. 51, No. 7, Jul. 1, 2013.
Office action dated Jun. 8, 2015, U.S. Appl. No. 14/178,042, filed Feb. 11, 2014.
Office Action dated Jun. 10, 2015, U.S. Appl. No. 13/890,150, filed May 8, 2013.
Rosen, E. et al., "BGP/MPLS VPNs", Mar. 1999.
Office Action for U.S. Appl. No. 14/577,785, filed Dec. 19, 2014, dated Apr. 13, 2015.
Office Action for U.S. Appl. No. 13/786,328, filed Mar. 5, 2013, dated Mar. 13, 2015.
Office Action for U.S. Appl. No. 13/425,238, filed Mar. 20, 2012, dated Mar. 12, 2015.
Abawajy J. "An Approach to Support a Single Service Provider Address Image for Wide Area Networks Environment" Centre for Parallel and Distributed Computing, School of Computer Science Carleton University, Ottawa, Ontario, K1S 5B6, Canada.
Eastlake, D. et al., 'RBridges: TRILL Header Options', Dec. 24, 2009, pp. 1-17, TRILL Working Group.
Perlman, Radia et al., 'RBridge VLAN Mapping', TRILL Working Group, Dec. 4, 2009, pp. 1-12.
'An Introduction to Brocade VCS Fabric Technology', Brocade white paper, http://community.brocade.com/docs/DOC-2954, Dec. 3, 2012.
Switched Virtual Networks. 'Internetworking Moves Beyond Bridges and Routers' Data Communications, McGraw Hill. New York, US, vol. 23, No. 12, Sep. 1, 1994 (Sep. 1, 1994), pp. 66-70,72,74, XP000462385 ISSN: 0363-6399.
U.S. Appl. No. 13/030,806 Office Action dated Dec. 3, 2012.
Office Action dated Apr. 9, 2014, U.S. Appl. No. 13/092,724, filed Apr. 22, 2011.
Office action dated Jan. 10, 2014, U.S. Appl. No. 13/092,580, filed Apr. 22, 2011.
Office action dated Jan. 16, 2014, U.S. Appl. No. 13/042,259, filed Mar. 7, 2011.
Office action dated Jul. 31, 2013, U.S. Appl. No. 13/042,259, filed Mar. 7, 2011.
Office Action dated Mar. 14, 2014, U.S. Appl. No. 13/092,460, filed Apr. 22, 2011.
Office Action dated Mar. 26, 2014, U.S. Appl. No. 13/092,701, filed Apr. 22, 2011.
Office Action dated Apr. 9, 2014, U.S. Appl. No. 13/092,752, filed Apr. 22, 2011.
Office action dated Jan. 6, 2014, U.S. Appl. No. 13/092,877, filed Apr. 22, 2011.
Office action dated Oct. 2, 2013, U.S. Appl. No. 13/044,326, filed Mar. 9, 2011.
Office action dated Dec. 2, 2013, U.S. Appl. No. 13/184,526, filed Jul. 16, 2011.
Office action dated Nov. 29, 2013, U.S. Appl. No. 13/092,873, filed Apr. 22, 2011.
Office Action dated Mar. 6, 2014, U.S. Appl. No. 13/425,238, filed Mar. 20, 2012.
Office action dated Nov. 12, 2013, U.S. Appl. No. 13/312,903, filed Dec. 6, 2011.
Office Action dated Jun. 18, 2014, U.S. Appl. No. 13/440,861, filed Apr. 5, 2012.
Office Action dated Feb. 28, 2014, U.S. Appl. No. 13/351,513, filed Jan. 17, 2012.
Office Action dated May 9, 2014, U.S. Appl. No. 13/484,072, filed May 30, 2012.
Office Action dated May 14, 2014, U.S. Appl. No. 13/533,843, filed Jun. 26, 2012.
Office Action dated Feb. 20, 2014, U.S. Appl. No. 13/598,204, filed Aug. 29, 2012.
Office Action dated Jun. 6, 2014, U.S. Appl. No. 13/669,357, filed Nov. 5, 2012.
Brocade, 'Brocade Fabrics OS (FOS) 6.2 Virtual Fabrics Feature Frequently Asked Questions', pp. 1-6, 2009 Brocade Communications Systems, Inc.
Brocade, 'FastIron and TurboIron 24x Configuration Guide', Feb. 16, 2010.
Brocade, 'The Effortless Network: Hyperedge Technology for the Campus LAN' 2012.
Brocade 'Brocade Unveils' The Effortless Network, http://newsroom.brocade.com/press-releases/brocade-unveils-the-effortless-network-nasdaq-brcd-0859535, 2012.

(56) References Cited

OTHER PUBLICATIONS

Christensen, M. et al., 'Considerations for Internet Group Management Protocol (IGMP) and Multicast Listener Discovery (MLD) Snooping Switches', May 2006.
FastIron Configuration Guide Supporting Ironware Software Release 07.0.00, Dec. 18, 2009.
Foundary FastIron Configuration Guide, Software Release FSX 04.2.00b, Software Release FWS 04.3.00, Software Release FGS 05.0.00a, Sep. 2008.
Huang, Nen-Fu et al., 'An Effective Spanning Tree Algorithm for a Bridged LAN', Mar. 16, 1992.
Knight, 'Network Based IP VPN Architecture using Virtual Routers', May 2003.
Knight P et al: 'Layer 2 and 3 Virtual Private Networks: Taxonomy, Technology, and Standardization Efforts', IEEE Communications Magazine, IEEE Service Center, Piscataway, US, vol. 42, No. 6, Jun. 1, 2004 (Jun. 1, 2004), pp. 124-131, XP001198207, ISSN: 0163-6804, DOI: 10.1109/MCOM.2004.1304248.
Knight S et al: 'Virtual Router Redundancy Protocol' Internet Citation Apr. 1, 1998 (Apr. 1, 1998), XP002135272 Retrieved from the Internet: URL:ftp://ftp.isi.edu/in-notes/rfc2338.txt [retrieved on Apr. 10, 2000].
Kreeger, L. et al., 'Network Virtualization Overlay Control Protocol Requirements draft-kreeger-nvo3-overlay-cp-00', Jan. 30, 2012.
Lapuh, Roger et al., 'Split Multi-link Trunking (SMLT)', draft-lapuh-network-smlt-08, Jul. 2008.
Lapuh, Roger et al., 'Split Multi-Link Trunking (SMLT)', Network Working Group, Oct. 2012.
Louati, Wajdi et al., 'Network-based virtual personal overlay networks using programmable virtual routers', IEEE Communications Magazine, Jul. 2005.
Narten, T. et al., 'Problem Statement: Overlays for Network Virtualization d raft-narten-n vo3-over l ay-problem -statement-01', Oct. 31, 2011.
Office Action for U.S. Appl. No. 13/092,752, filed Apr. 22, 2011, from Park, Jung H., dated Jul. 18, 2013.
Office Action for U.S. Appl. No. 13/365,993, filed Feb. 3, 2012, from Cho, Hong Sol., dated Jul. 23, 2013.
Office Action for U.S. Appl. No. 12/725,249, filed Mar. 16, 2010, dated Apr. 26, 2013.
Office Action for U.S. Appl. No. 12/725,249, filed Mar. 16, 2010, dated Sep. 12, 2012.
Office Action for U.S. Appl. No. 12/950,968, filed Nov. 19, 2010, dated Jan. 4, 2013.
Office Action for U.S. Appl. No. 12/950,968, filed Nov. 19, 2010, dated Jun. 7, 2012.
Office Action for U.S. Appl. No. 12/950,974, filed Nov. 19, 2010, dated Dec. 20, 2012.
Office Action for U.S. Appl. No. 12/950,974, filed Nov. 19, 2010, dated May 24, 2012.
Office Action for U.S. Appl. No. 13/030,688, filed Feb. 18, 2011, dated Apr. 25, 2013.
Office Action for U.S. Appl. No. 13/030,806, filed Feb. 18, 2011, dated Jun. 11, 2013.
Office Action for U.S. Appl. No. 13/042,259, filed Mar. 7, 2011, dated Mar. 18, 2013.
Office Action for U.S. Appl. No. 13/042,259, filed Mar. 7, 2011, dated Jul. 31, 2013.
Office Action for U.S. Appl. No. 13/044,301, filed Mar. 9, 2011, dated Feb. 22, 2013.
Office Action for U.S. Appl. No. 13/044,301, filed Mar. 9, 2011, dated Jun. 11, 2013.
Office Action for U.S. Appl. No. 13/044,326, filed Mar. 9, 2011, dated Oct. 2, 2013.
Office Action for U.S. Appl. No. 13/050,102, filed Mar. 17, 2011, dated Oct. 26, 2012.
Office Action for U.S. Appl. No. 13/050,102, filed Mar. 17, 2011, dated May 16, 2013.
Office Action for U.S. Appl. No. 13/087,239, filed Apr. 14, 2011, dated May 22, 2013.
Office Action for U.S. Appl. No. 13/092,460, filed Apr. 22, 2011, dated Jun. 21, 2013.
Office Action for U.S. Appl. No. 13/092,580, filed Apr. 22, 2011, dated Jun. 10, 2013.
Office Action for U.S. Appl. No. 13/092,701, filed Apr. 22, 2011, dated Jan. 28, 2013.
Office Action for U.S. Appl. No. 13/092,701, filed Apr. 22, 2011, dated Jul. 3, 2013.
Office Action for U.S. Appl. No. 13/092,724, filed Apr. 22, 2011, dated Feb. 5, 2013.
Office Action for U.S. Appl. No. 13/092,724, filed Apr. 22, 2011, dated Jul. 16, 2013.
Office Action for U.S. Appl. No. 13/092,752, filed Apr. 22, 2011, dated Feb. 5, 2013.
Office Action for U.S. Appl. No. 13/092,864, filed Apr. 22, 2011, dated Sep. 19, 2012.
Office Action for U.S. Appl. No. 13/092,873, filed Apr. 22, 2011, dated Jun. 19, 2013.
Office Action for U.S. Appl. No. 13/092,877, filed Apr. 22, 2011, dated Mar. 4, 2013.
Office Action for U.S. Appl. No. 13/092,877, filed Apr. 22, 2011, dated Sep. 5, 2013.
Office Action for U.S. Appl. No. 13/098,360, filed Apr. 29, 2011, dated May 31, 2013.
Office Action for U.S. Appl. No. 13/098,490, filed May 2, 2011, dated Dec. 21, 2012.
Office Action for U.S. Appl. No. 13/098,490, filed May 2, 2011, dated Jul. 9, 2013.
Office Action for U.S. Appl. No. 13/184,526, filed Jul. 16, 2011, dated Jan. 28, 2013.
Office Action for U.S. Appl. No. 13/184,526, filed Jul. 16, 2011, dated May 22, 2013.
Office Action for U.S. Appl. No. 13/365,808, filed Jul. 18, 2013, dated Jul. 18, 2013.
Office Action for U.S. Appl. No. 13/533,843, filed Jun. 26, 2012, dated Oct. 21, 2013.
Office Action for U.S. Appl. No. 13/092,887, dated Jan. 6, 2014.
Perlman, Radia et al., 'Challenges and Opportunities in the Design of TRILL: a Routed layer 2 Technology', 2009.
Perlman, Radia et al., 'RBridges: Base Protocol Specification; Draft-ietf-trill-rbridge-protocol-16.txt', Mar. 3, 2010, pp. 1-117.
S. Nadas et al., 'Virtual Router Redundancy Protocol (VRRP) Version 3 for IPv4 and IPv6', Internet Engineering Task Force, Mar. 2010.
'RBridges: Base Protocol Specification', IETF Draft, Perlman et al., Jun. 26, 2009.
Office action dated Aug. 29, 2014, U.S. Appl. No. 13/042,259, filed Mar. 7, 2011.
Office action dated Aug. 21, 2014, U.S. Appl. No. 13/184,526, filed Jul. 16, 2011.
Brocade 'An Introduction to Brocade VCS Fabric Technology', Dec. 3, 2012.
Office Action for U.S. Appl. No. 13/042,259, filed Mar. 7, 2011, from Jaroenchonwanit, Bunjob, dated Jan. 16, 2014.
Office Action for U.S. Appl. No. 13/030,806, filed Feb. 18, 2011, dated Dec. 3, 2012.
Office Action for U.S. Appl. No. 13/098,490, filed May 2, 2011, dated Mar. 27, 2014.
Office Action for U.S. Appl. No. 13/312,903, filed Dec. 6, 2011, dated Jun. 13, 2013.
Office Action for U.S. Appl. No. 13/092,873, filed Apr. 22, 2011, dated Nov. 29, 2013.
Office Action for U.S. Appl. No. 13/184,526, filed Jul. 16, 2011, dated Dec. 2, 2013.
Office Action for U.S. Appl. No. 13/598,204, filed Aug. 29, 2012, dated Feb. 20, 2014.
Office action dated Apr. 26, 2012, U.S. Appl. No. 12/725,249, filed Mar. 16, 2010.
Office action dated Sep. 12, 2012, U.S. Appl. No. 12/725,249, filed Mar. 16, 2010.
Office action dated Dec. 21, 2012, U.S. Appl. No. 13/098,490, filed May 2, 2011.

(56) References Cited

OTHER PUBLICATIONS

Office action dated Mar. 27, 2014, U.S. Appl. No. 13/098,490, filed May 2, 2011.
Office action dated Jul. 9, 2013, U.S. Appl. No. 13/098,490, filed May 2, 2011.
Office action dated May 22, 2013, U.S. Appl. No. 13/087,239, filed Apr. 14, 2011.
Office action dated Dec. 5, 2012, U.S. Appl. No. 13/087,239, filed Apr. 14, 2011.
Office action dated Feb. 5, 2013, U.S. Appl. No. 13/092,724, filed Apr. 22, 2011.
Office action dated Jun. 10, 2013, U.S. Appl. No. 13/092,580, filed Apr. 22, 2011.
Office action dated Mar. 18, 2013, U.S. Appl. No. 13/042,259, filed Mar. 7, 2011.
Office action dated Jun. 21, 2013, U.S. Appl. No. 13/092,460, filed Apr. 22, 2011.
Office action dated Jan. 28, 2013, U.S. Appl. No. 13/092,701, filed Apr. 22, 2011.
Office action dated Jul. 3, 2013, U.S. Appl. No. 13/092,701, filed Apr. 22, 2011.
Office action dated Jul. 18, 2013, U.S. Appl. No. 13/092,752, filed Apr. 22, 2011.
Office action dated Dec. 20, 2012, U.S. Appl. No. 12/950,974, filed Nov. 19, 2010.
Office action dated May 24, 2012, U.S. Appl. No. 12/950,974, filed Nov. 19, 2010.
Office action dated Sep. 5, 2013, U.S. Appl. No. 13/092,877, filed Apr. 22, 2011.
Office action dated Mar. 4, 2013, U.S. Appl. No. 13/092,877, filed Apr. 22, 2011.
Office action dated Jan. 4, 2013, U.S. Appl. No. 12/950,968, filed Nov. 19, 2010.
Office action dated Jun. 7, 2012, U.S. Appl. No. 12/950,968, filed Nov. 19, 2010.
Office action dated Sep. 19, 2012, U.S. Appl. No. 13/092,864, filed Apr. 22, 2011.
Office action dated May 31, 2013, U.S. Appl. No. 13/098,360, filed Apr. 29, 2011.
Office action dated Dec. 3, 2012, U.S. Appl. No. 13/030,806, filed Feb. 18, 2011.
Office action dated Apr. 22, 2014, U.S. Appl. No. 13/030,806, filed Feb. 18, 2011.
Office action dated Jun. 11, 2013, U.S. Appl. No. 13/030,806, filed Feb. 18, 2011.
Office action dated Apr. 25, 2013, U.S. Appl. No. 13/030,688, filed Feb. 18, 2011.
Office action dated Feb. 22, 2013, U.S. Appl. No. 13/044,301, filed Mar. 9, 2011.
Office action dated Jun. 11, 2013, U.S. Appl. No. 13/044,301, filed Mar. 9, 2011.
Office action dated Oct. 26, 2012, U.S. Appl. No. 13/050,102, filed Mar. 17, 2011.
Office action dated May 16, 2013, U.S. Appl. No. 13/050,102, filed Mar. 17, 2011.
Office action dated Aug. 4, 2014, U.S. Appl. No. 13/050,102, filed Mar. 17, 2011.
Office action dated Jan. 28, 2013, U.S. Appl. No. 13/148,526, filed Jul. 16, 2011.
Office action dated May 22, 2013, U.S. Appl. No. 13/148,526, filed Jul. 16, 2011.
Office action dated Jun. 19, 2013, U.S. Appl. No. 13/092,873, filed Apr. 22, 2011.
Office action dated Jul. 18, 2013, U.S. Appl. No. 13/365,808, filed Feb. 3, 2012.
Office action dated Jun. 13, 2013, U.S. Appl. No. 13/312,903, filed Dec. 6, 2011.
Lapuh, Roger et al., 'Split Multi-link Trunking (SMLT) draft-lapuh-network-smlt-08', Jan. 2009.
Office Action for U.S Appl. No. 13/030,688, filed Feb. 18, 2011, dated Jul. 17, 2014.
Office Action for U.S. Appl. No. 13/044,326, filed Mar. 9, 2011, dated Jul. 7, 2014.
Office Action for U.S. Appl. No. 13/092,752, filed Apr. 22, 2011, dated Apr. 9, 2014.
Office Action for U.S. Appl. No. 13/092,873, filed Apr. 22, 2011, dated Jul. 25, 2014.
Office Action for U.S. Appl. No. 13/092,877, filed Apr. 22, 2011, dated Jun. 20, 2014.
Office Action for U.S. Appl. No. 13/312,903, filed Dec. 6, 2011, dated Aug. 7, 2014.
Office Action for U.S. Appl. No. 13/351,513, filed Jan. 17, 2012, dated Jul. 24, 2014.
Office Action for U.S. Appl. No. 13/425,238, filed Mar. 20, 2012, dated Mar. 6, 2014.
Office Action for U.S. Appl. No. 13/556,061, filed Jul. 23, 2012, dated Jun. 6, 2014.
Office Action for U.S. Appl. No. 13/742,207 dated Jul. 24, 2014, filed Jan. 15, 2013.
Office Action for U.S. Appl. No. 13/950,974, filed Nov. 19, 2010, from Haile, Awet A., dated Dec. 2, 2012.
Office Action for U.S. Appl. No. 13/087,239, filed Apr. 14, 2011, dated Dec. 5, 2012.
Office Action for U.S. Appl. No. 13/351,513, filed Jan. 17, 2012, dated Feb. 28, 2014.
Perlman R: 'Challenges and opportunities in the design of TRILL: a routed layer 2 technology', 2009 IEEE Globecom Workshops, Honolulu, HI, USA, Piscataway, NJ, USA, Nov. 30, 2009 (Nov. 30, 2009), pp. 1-6, XP002649647, DOI: 10.1109/GLOBECOM.2009.5360776 ISBN: 1-4244-5626-0 [retrieved on Jul. 19, 2011].
TRILL Working Group Internet-Draft Intended status: Proposed Standard RBridges: Base Protocol Specificaiton Mar. 3, 2010.
Office action dated Aug. 14, 2014, U.S. Appl. No. 13/092,460, filed Apr. 22, 2011.
Office action dated Jul. 7, 2014, for U.S. Appl. No. 13/044,326, filed Mar. 9, 2011.
Office Action dated Dec. 19, 2014, for U.S. Appl. No. 13/044,326, filed Mar. 9, 2011.
Office Action for U.S. Appl. No. 13/092,873, filed Apr. 22, 2011, dated Nov. 7, 2014.
Office Action for U.S. Appl. No. 13/092,877, filed Apr. 22, 2011, dated Nov. 10, 2014.
Office Action for U.S. Appl. No. 13/157,942, filed Jun. 10, 2011.
Mckeown, Nick et al. "OpenFlow: Enabling Innovation in Campus Networks", Mar. 14, 2008, www.openflow.org/documents/openflow-wp-latest.pdf.
Office Action for U.S. Appl. No. 13/044,301, dated Mar. 9, 2011.
Office Action for U.S. Appl. No. 13/184,526, filed Jul. 16, 2011, dated Jan. 5, 2015.
Office Action for U.S. Appl. No. 13/598,204, filed Aug. 29, 2012, dated Jan. 5, 2015.
Office Action for U.S. Appl. No. 13/669,357, filed Nov. 5, 2012, dated Jan. 30, 2015.
Office Action for U.S. Appl. No. 13/851,026, filed Mar. 26, 2013, dated Jan. 30, 2015.
Office Action for U.S. Appl. No. 13/092,460, filed Apr. 22, 2011, dated Mar. 13, 2015.
Office Action for U.S. Appl. No. 13/425,238, dated Mar. 12, 2015.
Office Action for U.S. Appl. No. 13/092,752, filed Apr. 22, 2011, dated Feb. 27, 2015.
Office Action for U.S. Appl. No. 13/042,259, filed Mar. 7, 2011, dated Feb. 23, 2015.
Office Action for U.S. Appl. No. 13/044,301, filed Mar. 9, 2011, dated Jan. 29, 2015.
Office Action for U.S. Appl. No. 13/050,102, filed Mar. 17, 2011, dated Jan. 26, 2015.
Office action dated Oct. 2, 2014, for U.S. Appl. No. 13/092,752, filed Apr. 22, 2011.
Kompella, Ed K. et al., 'Virtual Private LAN Service (VPLS) Using BGP for Auto-Discovery and Signaling' Jan. 2007.
"Network based IP VPN Architecture using Virtual Routers" Paul Knight et al.

(56) References Cited

OTHER PUBLICATIONS

Yang Yu et al "A Framework of using OpenFlow to handle transient link failure", TMEE, 2011 International Conference on, IEEE, Dec. 16, 2011.
Office Action for U.S. Appl. No. 15/227,789, dated Feb. 27, 2017.
Office Action for U.S. Appl. No. 14/822,380, dated Feb. 8, 2017.
Office Action for U.S. Appl. No. 14/704,660, dated Feb. 27, 2017.
Office Action for U.S. Appl. No. 14/510,913, dated Mar. 3, 2017.
Office Action for U.S. Appl. No. 14/473,941, dated Feb. 8, 2017.
Office Action for U.S. Appl. No. 14/329,447, dated Feb. 10, 2017.
Office Action for U.S. Appl. No. 14/662,095, dated Mar. 24, 2017.
Office Action for U.S. Appl. No. 15/005,967, dated Mar. 31, 2017.
Office Action for U.S. Appl. No. 15/215,377, dated Apr. 7, 2017.
Office Action for U.S. Appl. No. 13/098,490, dated Apr. 6, 2017.
Office Action for U.S. Appl. No. 14/662,092, dated Mar. 29, 2017.
Office Action for U.S. Appl. No. 14/510, 913, dated Jun. 30, 2017.
Office Action for U.S. Appl. No. 15/005,946, dated Jul. 14, 2017.
Office Action for U.S. Appl. No. 13/092,873, dated Jul. 19, 2017.
Office Action for U.S. Appl. No. 15/047,539, dated Aug. 7, 2017.
Office Action for U.S. Appl. No. 14/830,035, dated Aug. 28, 2017.
Office Action for U.S. Appl. No. 13/098,490, dated Aug. 24, 2017.
Office Action for U.S. Appl. No. 13/786,328, dated Aug. 21, 2017.
Office Action for U.S. Appl. No. 13/288,822, dated May 26, 2017.
Office Action for U.S. Appl. No. 14/329,447, dated Jun. 8, 2017.
Office Action for U.S. Appl. No. 14/817,097, dated May 4, 2017.
Office Action for U.S. Appl. No. 14/872,966, dated Apr. 20, 2017.
Office Action for U.S. Appl. No. 14/680,915, dated May 3, 2017.
Office Action for U.S. Appl. No. 14/792,166, dated Apr. 26, 2017.
Office Action for U.S. Appl. No. 14/660,803, dated May 17, 2017.
Office Action for U.S. Appl. No. 14/488,173, dated May 12, 2017.
Office Action dated Jun. 13, 2018, U.S. Appl. No. 13/786,328, filed Mar. 5, 2013.
IEEE et al., "Amendment to Carrier Sense Multiple Access with Collision Detection (CSMA/CD) Access Method and Physical Layer Specifications—Aggregation of Multiple Link Segments", Mar. 30, 2000, IEEE Computer Society, IEEE Std 802.3ad-2000, pp. 116-117.
Office Action dated Jul. 13, 2018, U.S. Appl. No. 15/402,924, filed Jul. 13, 2018.
Office Action dated Jul. 24, 2018, U.S. Appl. No. 14/799,371, filed Jul. 24, 2018.
Office Action for U.S. Appl. No. 14/216,292, dated Oct. 6, 2017.
Office Action dated Oct. 25, 2017, U.S. Appl. No. 14/867,865, filed Sep. 28, 2015.
Office action dated Oct. 26, 2017, U.S. Appl. No. 14/817,097, filed Aug. 3, 2015.
Office Action dated Mar. 20, 2018, U.S. Appl. No. 14/867,865, filed Sep. 28, 2015.

* cited by examiner

VLAG DATABASE 140

| SWITCH ID 142 | PORT ID 144 | PORT PRIORITY 146 | STATUS 148 | ACK FLAG 149 |
|---|---|---|---|---|
| 151 | 161 | 32768 | -- | ALL_NOT_ACK |
| 152 | 162 | 32768 | -- | X |
| 151 | 163 | 32768 | -- | ALL_NOT_ACK |
| 153 | 164 | 32768 | -- | X |
| 152 | 165 | 32768 | -- | X |
| 153 | 166 | 32768 | -- | X |

FIG. 2C

VLAG DATABASE 140

| SWITCH ID 142 | PORT ID 144 | PORT PRIORITY 146 | STATUS 148 | ACK FLAG 149 |
|---|---|---|---|---|
| 151 | 161 | 32768 | SELECTED | ALL_ACK |
| 152 | 162 | 32768 | SELECTED | X |
| 151 | 163 | 32768 | SELECTED | ALL_ACK |
| 153 | 164 | 32768 | SELECTED | X |
| 152 | 165 | 32768 | STANDBY | X |
| 153 | 166 | 32768 | STANDBY | X |

FIG. 2D

VLAG DATABASE 144

| SWITCH ID 142 | PORT ID 144 | PORT PRIORITY 146 | STATUS 148 | ACK FLAG 149 |
|---|---|---|---|---|
| 151 | 161 | 32768 | SELECTED | X |
| 152 | 162 | 32768 | SELECTED | X |
| 151 | 163 | 32768 | SELECTED | X |
| 153 | 164 | 32768 | SELECTED | ALL_ACK |
| 152 | 165 | 32768 | STANDBY | X |
| 153 | 166 | 32768 | STANDBY | ALL_ACK |

FIG. 3B

VLAG DATABASE 144

| SWITCH ID 142 | PORT ID 144 | PORT PRIORITY 146 | STATUS 148 | ACK FLAG 149 |
|---|---|---|---|---|
| 151 | 161 | 32768 | SELECTED | X |
| 152 | 162 | 32768 | SELECTED | X |
| 151 | 163 | 32768 | SELECTED | X |
| 152 | 165 | 32768 | SELECTED | X |
| 153 | 166 | 32768 | STANDBY | ALL_ACK |

FIG. 3C

DISTRIBUTED HOT STANDBY LINKS FOR VLAG

RELATED APPLICATIONS

This application claims the benefit of:

U.S. Provisional Application No. 61/955,664, titled "Distributed Hot Standby Links For vLAG," by inventors Prabu Thayalan, Shivalingayya Chikkamath, and Mythilikanth Raman, filed 19 Mar. 2014, the disclosure of which is incorporated by reference herein.

The present disclosure is related to:

U.S. patent application Ser. No. 13/087,239, "Virtual Cluster Switching," by inventors Suresh Vobbilisetty and Dilip Chatwani, filed 14 Apr. 2011 (hereinafter U.S. patent application Ser. No. 13/087,239);

U.S. patent application Ser. No. 13/092,724, titled "Fabric Formation for Virtual Cluster Switching," by inventors Shiv Haris and Phanidhar Koganti, filed 22 Apr. 2011 (hereinafter U.S. patent application Ser. No. 13/092,724); and U.S. Pat. No. 8,665,886, titled "Redundant Host Connection in a Routed Network," by inventors Somesh Gupta, Anoop Ghanwani, Phanidhar Koganti, and Shunjia Yu, issued 4 Mar. 2014 (hereinafter "U.S. Pat. No. 8,665,886"), the disclosures of which are incorporated by reference herein.

BACKGROUND

Field

The present disclosure relates to network management. More specifically, the present disclosure relates to a method and system for dynamically selecting and configuring links of a virtual link aggregation group in a distributed architecture.

Related Art

The exponential growth of the Internet has made it a popular delivery medium for multimedia applications, such as video on demand and television. Such applications have brought with them an increasing demand for bandwidth. As a result, equipment vendors race to build larger and faster switches with versatile capabilities, such as service insertion and provisioning, to move more traffic efficiently. However, the size of a switch cannot grow infinitely. It is limited by physical space, power consumption, and design complexity, to name a few factors. Furthermore, switches with higher capability are usually more complex and expensive. More importantly, because an overly large and complex system often does not provide economy of scale, simply increasing the size and capability of a switch may prove economically unviable due to the increased per-port cost.

A flexible way to improve the scalability of a switch system is to build a fabric switch. A fabric switch is a collection of individual member switches. These member switches form a single, logical switch that can have an arbitrary number of ports and an arbitrary topology. As demands grow, customers can adopt a "pay as you grow" approach to scale up the capacity of the fabric switch.

Meanwhile, layer-2 (e.g., Ethernet) switching technologies continue to evolve. More routing-like functionalities, which have traditionally been the characteristics of layer-3 (e.g., Internet Protocol or IP) networks, are migrating into layer-2.

As Internet traffic is becoming more diverse, virtual computing in a network is becoming progressively more important as a value proposition for network architects. For example, link aggregation involves the bundling of one or more physical ports to present a single interface to a client, thereby increasing bandwidth and providing redundancy. While protocols exist to facilitate link aggregation between two individual network elements, some issues remain unsolved when using link aggregation in a distributed architecture. Particularly, when an individual network element is coupled to multiple individual member switches of a fabric switch, existing technologies do not provide a scalable and flexible solution for establishing and controlling active and standby links of a virtual link aggregation group associated with the multiple individual member switches.

SUMMARY

One embodiment of the present invention provides a switch. The switch includes a link aggregation module adapted to establish a virtual link aggregation group comprising a plurality of links coupling a network device to the switch and one or more other switches. The switch also includes an acknowledgment module adapted to identify an acknowledgment of a notification message from each of the one or more other switches, where the notification message includes port information associated with a local link participating in the virtual link aggregation group. The switch further includes a link selection module adapted to, in response to identifying the acknowledgment from each of the one or more other switches, determine a state for the local link based on the port information, where the state indicates whether the local link is an active link or a standby link for the virtual link aggregation group.

In a variation on this embodiment, the switch further includes a notification module adapted to construct a notification message destined to each of the one or more other switches, where the notification message indicates unavailability of the local link.

In a further variation, the switch includes a data structure which includes a plurality of link entries, where a respective link entry comprises port information for one of the plurality of links participating in the virtual link aggregation group.

In a further variation, the link selection module is further adapted to sort the link entries in the data structure based on the port information of a respective link entry, mark a predetermined number of the sorted link entries to indicate an active link carrying traffic, and mark a remaining number of the sorted link entries to indicate a standby link for failover.

In a further variation, the switch includes a link failure identification module adapted to identify unavailability of an active link, and the link selection module is further adapted to: remove a link entry comprising port information of the identified link; identify a link entry indicated as standby based on the port information in a respective link entry in the data structure; and mark the identified link entry to indicate an active link carrying traffic.

In a further variation, the switch and the one or more other switches are member switches of a fabric switch, where the fabric switch operates as a single switch. The switch identifier for a respective member switch is one or more of: a Transparent Interconnection of Lots of Links (TRILL) routing bridge identifier; an internet protocol (IP) address; and a media access control (MAC) address.

In a further variation, the port information includes a port priority and a port identifier of a port coupled to the local link.

In a further variation, the link selection module is further adapted to: determine superior port information among respective port information of a local port and a remote port coupled to the local link based on respective system identifiers of the switch and the network device; and set the superior port information as the port information associated with the local link.

In a further variation, the system identifier of the switch is based on a virtual media access control (MAC) address shared by the switch and the one or more other switches and the system identifier of the network device is based on a MAC address of the network device.

In a further variation, the link selection module is further adapted to, in response to determining that a port coupled to the local link is in a defaulted state, set the port information of the port as the port information associated with the local link.

In a further variation, the switch includes a validation module adapted to determine whether information associated with the network device is valid, where the information is extracted from a control message received from the network device, and where the control message includes a port priority and a port identifier of a port of the network device.

In a further variation, the plurality of links in the virtual link aggregation group comprises one or more of: an active link which carries traffic; and a standby link which remains standby for the active link.

BRIEF DESCRIPTION OF THE FIGURES

FIG. 2C illustrates an exemplary vLAG database maintained by a switch, corresponding to FIGS. 1A and 2A, in accordance with an embodiment of the present invention.

FIG. 2D illustrates an exemplary vLAG database maintained by a switch, corresponding to FIGS. 1A and 2B, in accordance with an embodiment of the present invention.

FIG. 3B illustrates an exemplary vLAG database maintained by a switch, corresponding to the network depicted in FIG. 3A, in accordance with an embodiment of the present invention.

FIG. 3C illustrates an exemplary vLAG database maintained by a switch, corresponding to the network depicted in FIG. 3A, in accordance with an embodiment of the present invention.

In the figures, like reference numerals refer to the same figure elements.

DETAILED DESCRIPTION

Figure 1A:
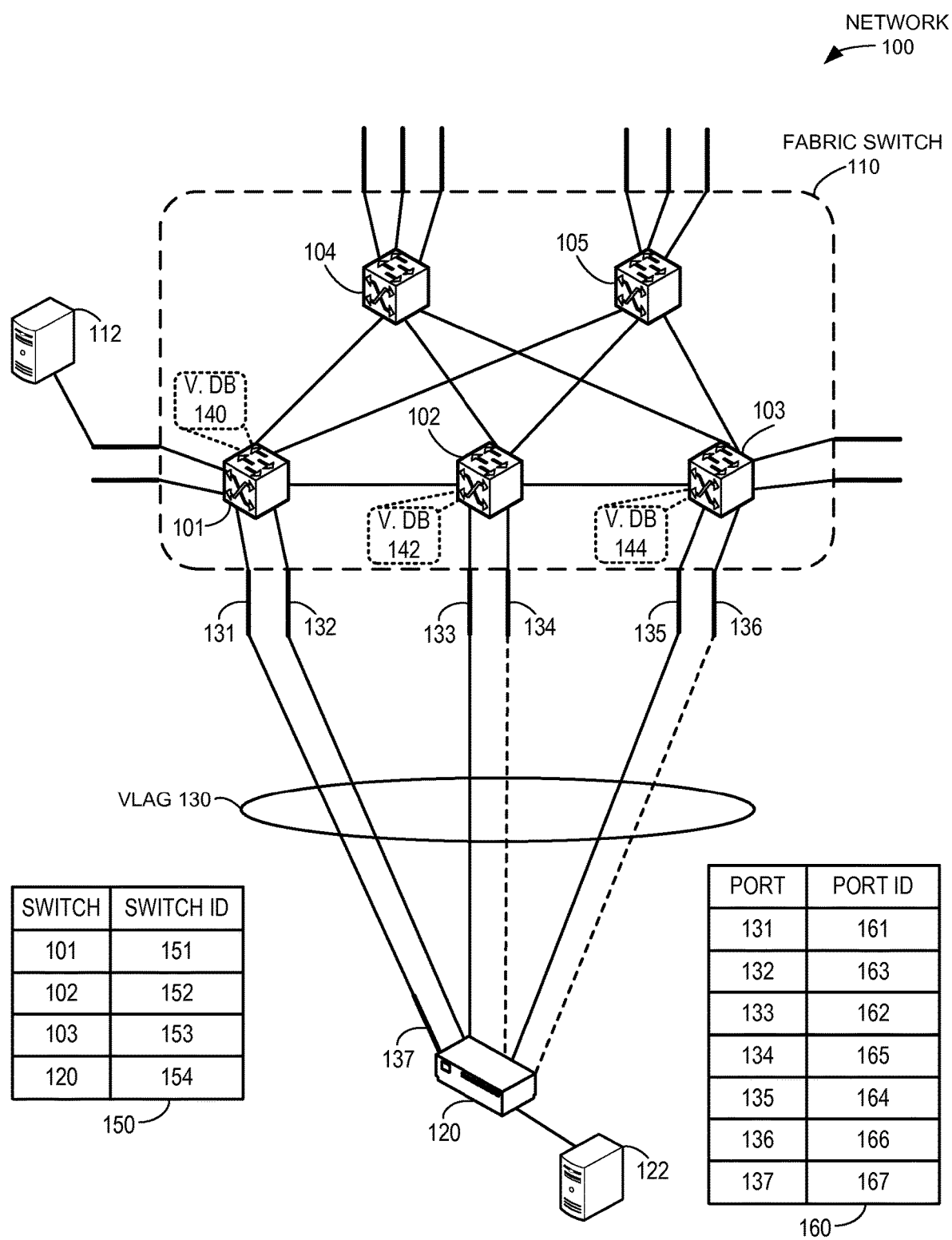
FIG. 1A illustrates an exemplary network that includes a switch capable of establishing and controlling active and standby links of a virtual link aggregation group, in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

Overview

In embodiments of the present invention, the problem of efficiently determining active and standby links from a virtual link aggregation group in a distributed architecture (e.g., a fabric switch that includes multiple member switches) is solved by allowing each member switch to dynamically configure a local database and perform a same hot standby link selection (HSL) algorithm based on its configured database. The distributed solution of the present invention is distinct from technologies that rely on a centralized approach, e.g., by designating a single master switch that controls, monitors, and determines state for links in a link aggregation group. In such a centralized approach, the failure of the master switch can result in decreased reliability. Furthermore, the period involved to transition a failed master switch to another switch can result in decreased efficiency. Relying on a single master switch can also lead to potential black holes for data that arrives at the failed master switch during the failover period. A centralized approach can also result in scalability issues because as additional member switches with additional network links join the fabric switch, the master switch remains solely responsible for determining active and standby links for the additional member switches. This may also result in decreased efficiency.

To solve these problems, embodiments of the present invention provide a system that applies a hot standby link (HSL) selection algorithm to each member switch. The system configures a virtual link aggregation group (vLAG) database on each member switch participating in a virtual link aggregation group. A method for provisioning multi-device link aggregation is described in U.S. Pat. No. 8,655,886, titled "Redundant Host Connection In A Routed Network," which is hereby incorporated by reference. The system maintains synchronization of the vLAG database across all member switches, and applies a same HSL selection algorithm on all member switches based on the vLAG database. The HSL selection algorithm allows each member switch to determine the priority of each link that belongs to the virtual link aggregation group, whether the links are active or standby, and which standby link to transition to active when an active link fails. Each member switch applies the same HSL selection algorithm to its own synchronized and dynamically configured instance of the vLAG database, thus facilitating the dynamic and consistent selection of active and standby links of a vLAG in a distributed architecture.

In some embodiments, the fabric switch is an Ethernet fabric switch in which any number of switches coupled in an arbitrary topology may logically operate as a single switch. Any new switch may join or leave the fabric switch in "plug-and-play" mode without any manual configuration. A fabric switch appears as a single logical switch to an external device. In some further embodiments, the fabric switch is a Transparent Interconnection of Lots of Links (TRILL) network and a respective member of switch of the fabric switch is a TRILL routing bridge (RBridge). In some embodiments, the fabric switch is layer-3 (e.g., Internet Protocol or IP) network and a member switch is a layer-3 node (e.g., capable of routing based on a routing protocol).

Although the present disclosure is presented using examples based on the TRILL protocol, embodiments of the present invention are not limited to networks defined using TRILL, or a particular Open System Interconnection Reference Model (OSI reference model) layer. For example, embodiments of the present invention can also be applied to a multi-protocol label switching (MPLS) network. In this disclosure, the term "fabric switch" is used in a generic sense, and can refer to a network operating in any networking layer, sub-layer, or a combination of networking layers.

The term "end device" can refer to a device coupled to a fabric switch. An end device can be a host, a server, a conventional layer-2 switch, a layer-3 router, or any other type of device. Additionally, an end device can be coupled to other switches or hosts further away from a network. An end device can also be an aggregation point for a number of network devices to enter the network. The terms "device" and "machine" are used interchangeably.

The term "tunnel" refers to a data communication where one or more networking protocols are encapsulated using another networking protocol. Although the present disclosure is presented using examples based on a layer-3 encapsulation of a layer-2 protocol, "tunnel" should not be interpreted as limiting embodiments of the present invention to layer-2 and layer-3 protocols. A "tunnel" can be established for any networking layer, sub-layer, or a combination of networking layers.

The term "frame" refers to a group of bits that can be transported together across a network. "Frame" should not be interpreted as limiting embodiments of the present invention to layer-2 networks. "Frame" can be replaced by other terminologies referring to a group of bits, such as "packet," "cell," or "datagram."

The term "switch" is used in a generic sense, and it can refer to any standalone or fabric switch operating in any network layer. "Switch" should not be interpreted as limiting embodiments of the present invention to layer-2 networks. Any device that can forward traffic to an external device or another switch can be referred to as a "switch." Examples of a "switch" include, but are not limited to, a layer-2 switch, a layer-3 router, a TRILL RBridge, or a fabric switch comprising a plurality of similar or heterogeneous smaller physical switches.

The term "RBridge" refers to routing bridges, which are bridges implementing the TRILL protocol as described in Internet Engineering Task Force (IETF) Request for Comments (RFC) "Routing Bridges (RBridges): Base Protocol Specification," available at http://tools.ietf.org/html/rfc6325, which is incorporated by reference herein. Embodiments of the present invention are not limited to application among RBridges. Other types of switches, routers, and forwarders can also be used.

The term "edge port" refers to a port in a fabric switch which exchanges data frames with an external device outside of the fabric switch. The term "inter-switch port" refers to a port which couples a member switch of a fabric switch with another member switch and is used for exchanging data frames between the member switches.

The term "switch identifier" refers to a group of bits that can be used to identify a switch. If the switch is an RBridge, the switch identifier can be an "RBridge identifier." The TRILL standard uses "RBridge ID" to denote a 48-bit Intermediate-System-to-Intermediate-System (IS-IS) ID assigned to an RBridge, and "RBridge nickname" to denote a 16-bit value that serves as an abbreviation for the "RBridge ID." In this disclosure, "switch identifier" is used as a generic term, is not limited to any bit format, and can refer to any format that can identify a switch. The term "RBridge identifier" is used in a generic sense, is not limited to any bit format, and can refer to "RBridge ID," "RBridge nickname," or any other format that can identify an RBridge.

The term "fabric switch" refers to a number of interconnected physical switches which form a single, scalable logical switch. In a fabric switch, any number of switches can be connected in an arbitrary topology, and the entire group of switches functions together as one single, logical switch. This feature makes it possible to use many smaller, inexpensive switches to construct a large fabric switch, which can be viewed as a single logical switch externally.

Network Architecture

FIG. 1A illustrates an exemplary network 100 that includes a switch capable of establishing and controlling active and standby links of a virtual link aggregation group, in accordance with an embodiment of the present invention. Network 100 can include a fabric switch 110, which includes member switches 101, 102, 103, 104, and 105. Some of member switches 101-105 can participate as "actor" member switches (e.g., switches 101, 102, and 103) in a virtual link aggregation group (vLAG) 130, while other member switches (e.g., switches 104 and 105) are "non-actor" member switches that do not participate in vLAG 130. Link aggregation in a fabric switch is described in U.S. Pat. No. 8,665,886, titled "Redundant Host Connection in a Routed Network," the disclosure of which is incorporated by reference herein. vLAG 130 includes links associated with ports 131 and 132 on switch 101, ports 133 and 134 on switch 102, and ports 135 and 136 on switch 103. The links of vLAG 130 are also each associated with a corresponding port on a network device 120 coupled to fabric switch 110. For example, the link that couples switch 101 to network device 120 is associated with port 131 on switch 101 and port 137 on network device 120. Some of the links associated with ports 131-136 are in an active state (e.g., actively transmitting data traffic), as indicated by the solid lines depicting links associated with ports 131, 132, 133, and 135, while others are in a "hot" standby state (e.g., ready to be transitioned to an active state upon failover of an active link), as indicated by the dashed lines depicting links associated with ports 134 and 136. In some embodiments, actor member switches 101, 102, and 103 communicate with network device 120 via a link aggregation communication protocol. Each actor member switch can maintain a virtual link aggregation database (e.g., switches 101, 102, and 103 maintain vLAG databases 140, 142, and 144, respectively). vLAG databases 140, 142, and 144 are synchronized based on the methods described herein. Fabric switch 110, via actor member switches 101-103, can be coupled to multiple network devices ("partners") via multiple vLAGs (not shown), where each actor member switch maintains one synchronized vLAG database for each partner and each vLAG.

Member switches 101-105 in fabric switch 110 use edge ports to communicate to end devices and inter-switch ports to communicate to other member switches. For example, switch 101 is coupled to an end device 112 via an edge port, to switches 102 and 104 via inter-switch ports, and to network device 120 via edge ports 131 and 132. Network device 120 can be an end device that is coupled to another end device 122. Examples of end devices 112, 120, and 122 include, but are not limited to, a layer-2 switch, layer-3 router, top-of-the-rack switch, and physical or virtual host machine. In some embodiments, fabric switch 110 is a TRILL network, switches 101-105 are each an RBridge, and data frames transmitted and received via inter-switch ports are encapsulated in TRILL headers. In some embodiments, fabric switch 110 is a layer-3 (e.g., IP) network, switches 101-105 are layer-3 nodes, and data frames transmitted and received via inter-switch ports are encapsulated in IP headers. Switch virtualization in a fabric switch and its associated operations, such as data frame forwarding, and fabric switch configurations are respectively described in U.S. Pat. No. 8,665,886, titled "Redundant Host Connection in a Routed Network," and U.S. patent application Ser. No. 13/087,239, titled "Virtual Cluster Switching," the disclosures of which are incorporated herein. A switch identifier can be associated with a respective member switch, as shown in a table 150, and a port identifier can be associated with a respective port, as shown in a table 160. For example, table 150 indicates that switch 101 has a switch identifier 151, and table 160 indicates that port 131 has a port identifier 161.

During operation, a respective actor member switch (e.g., switch 101) can determine port information for a local port (e.g., port 131), configure its virtual link aggregation group (vLAG) database 140 with the port information, and send a notification message with the configured port information ("port information message") to all other actor member switches (e.g., switches 102 and 103). The port information can include a port priority and a port identifier, and can be based on information received from network device 120 (e.g., relating to port 137 on network device 120 corresponding to port 131 on switch 101). Switch 101 waits to receive an acknowledgment of its notification message from switches 102 and 103. Upon receiving the acknowledgment from each of the other actor member switches, switch 101 determines a link state of "selected" or "standby" for all entries in vLAG database 140 based on the configured port information. Upon receiving the port information message, each of the other actor member switches (e.g., switches 102 and 103) can update its respective vLAG database (e.g., 142 and 144) to include the port information from the port information message. Subsequently, switches 102 and 103 can determine a link state for all entries in vLAG databases 142 and 144, respectively.

Figure 1B:
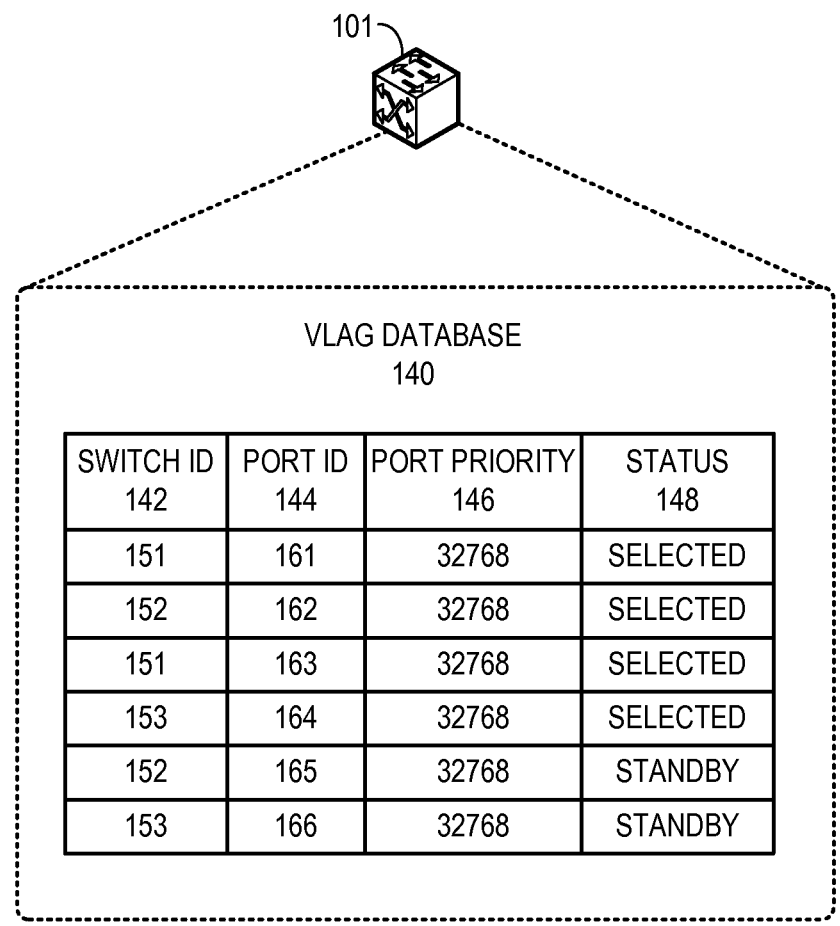
FIG. 1B illustrates an exemplary database maintained by a switch in FIG. 1A, in accordance with an embodiment of the present invention.

FIG. 1B illustrates an exemplary vLAG database 140 maintained by switch 101 in FIG. 1A, in accordance with an embodiment of the present invention. vLAG database 140 can include entries for links in vLAG 130, and each entry can include a switch identifier 142, a port identifier 144, a port priority 146, and a status 148. vLAG database 130 can be any data structure that includes the values described herein. The values for switch identifier 142 correspond to the values in table 150 for switches 101, 102, and 103, and the values for port identifier 144 correspond to the values in table 160 for ports 131-136. The values for port priority 146 can be manually configured by a user, determined by the software, or set to a default value (e.g., 32768). The values for status 148 (e.g., a "selected" or a "standby" state) are determined by switch 101 based on the port information and a maximum number of allowed active links, as described below in relation to FIG. 2B.

A respective actor member switch (e.g., switch 101) can also detect the unavailability of an active link associated with a port that is local to the switch, update its vLAG database to indicate the link unavailability, and send a notification message with the link unavailability information ("link unavailability message") to all other actor member switches. The actor member switch can determine which standby link to set to an active state based on its vLAG database. Failover is described and depicted below in relation to FIGS. 3A-3C and 4. Upon receiving the link unavailability message, each of the other actor member switches updates its vLAG database to indicate the unavailability and determines which standby link to set to an active state based on its vLAG database. Because each actor member switch performs the same HSL selection algorithm on its synchronized instance of the vLAG database, the same standby link is selected for failover from an unavailable active link, thereby facilitating the consistent selection of standby links in a vLAG in a distributed architecture.

Determining Port Information; Configuring the vLAG Database

Figure 2A:
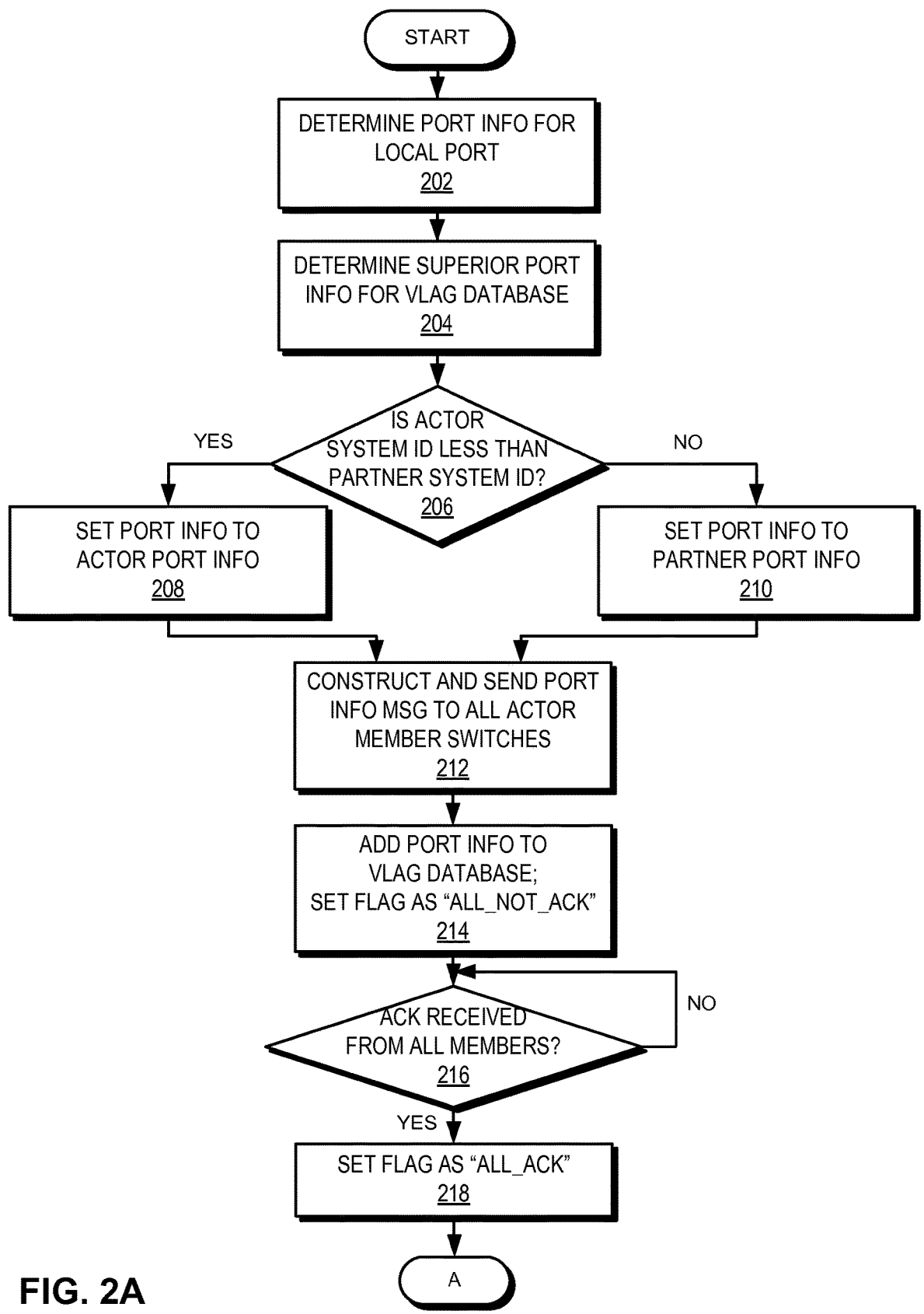
FIG. 2A presents a flowchart illustrating a process of a switch configuring a vLAG database, in accordance with an embodiment of the present invention.

FIG. 2A presents a flowchart illustrating a process of a switch configuring a vLAG database, in accordance with an embodiment of the present invention. During operation, a switch which is an actor member switch of a fabric switch can configure a maximum link feature by enabling a hot standby link feature. The switch ("actor") begins configuration of its vLAG database. First, the switch determines port information for a local port participating in the virtual link aggregation group (operation 202). In some embodiments, the switch determines valid information (e.g., port information) for a network device ("partner") coupled to the switch. The determined port information can include a port identifier and a port priority for the local port or a corresponding remote port of the partner. The determined port information for the local port can further indicate that the corresponding link is available to carry traffic. The actor determines superior port information by comparing the port information of the actor with the port information of the partner, and uses the superior port information to configure its vLAG database (operation 204). The superior port information can be determined based on a numerical value, a hash value, any known comparative feature, or any combination thereof. The vLAG database includes entries corresponding to a link participating in a virtual link aggregation group, where each entry includes the determined superior port information for the link.

The actor and the partner can each have an associated system identifier that is based on a system priority and a media access control (MAC) address for the respective device. A virtual MAC address can be associated with a fabric switch, where the virtual MAC address is shared by all member switches of the fabric switch, and a physical MAC address can be associated with the partner. In some embodiments, the system priority and the system identifier are based on a link aggregation control protocol. The actor compares the system identifier of the actor with the system identifier of the partner. If the system identifier of the actor is numerically less than the system identifier of the partner (decision 206), the actor sets the port information in the vLAG database to the port information of the actor (operation 208). In some embodiments, the switch sets a port priority of a corresponding link entry in the vLAG database to the port priority of the port information of the actor, and further sets a port identifier of the corresponding link entry to the port identifier of the port information of the actor. In some embodiments, the switch can begin configuration of the vLAG database even when it has not received any valid partner information, e.g., when the partner information is null or is in a defaulted state. In such a defaulted state, the actor uses the port information of the actor, as described above in relation to operation 208.

If the system identifier of the actor is not numerically less than the system identifier of the partner (decision 206), the actor sets the port information in the vLAG database to the port information of the partner (operation 210). In some embodiments, the switch sets a port priority of a corresponding link entry in the vLAG database to the port priority of the port information of the partner, and also sets a port identifier of the corresponding link entry to the port identifier of the port information of the partner The switch constructs a notification message that includes the determined port information ("port information message") and sends the port information message to all other actor member switches in the fabric switch (e.g., all member switches participating in the vLAG) (operation 212). The port information message is a reliable message with ensured delivery and can be a fabric-encapsulated message. For example, the port information message can be a TRILL-encapsulated message transmitted between RBridges in a TRILL network, or an IP-encapsulated message transmitted between layer-3 nodes in a layer-3 (e.g., IP) network. The switch adds the determined port information to its vLAG database and sets a flag for the corresponding link entry to "ALL_NOT_ACK" (operation 214). The switch is in a "pending" state, with a partially configured vLAG database, waiting to receive an acknowledgment of its port information message from each of the other actor member switches (decision 216). Upon receiving an acknowledgment back from each of the other actor member switches, the switch sets the flag for the corresponding link entry to "ALL_ACK" (operation 218) and moves to a "ready" state. The ready state indicates that the switch is ready to determine the link state for all entries in the vLAG database.

Figure 2B:
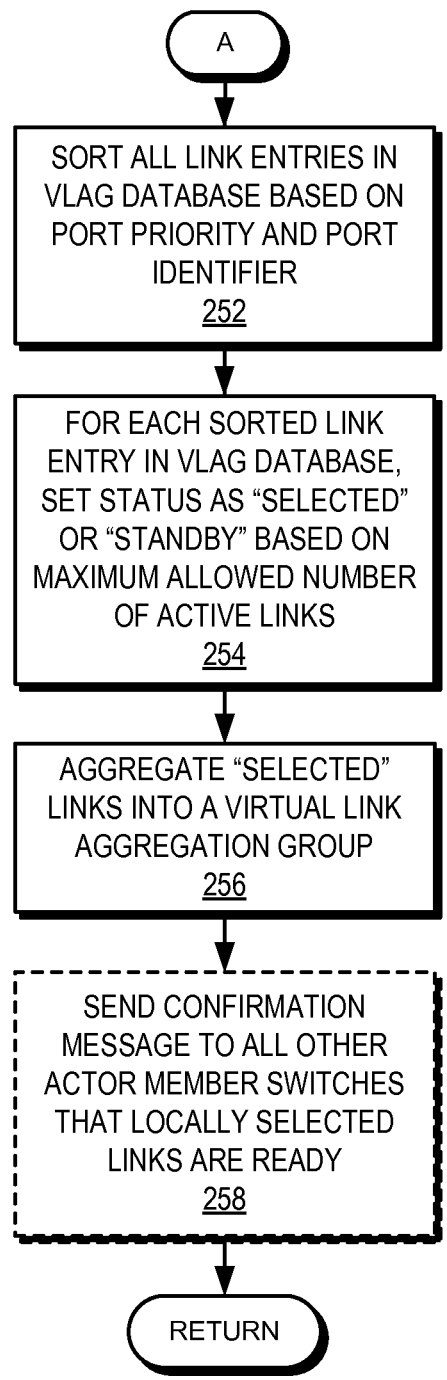
FIG. 2B presents a flowchart illustrating a process of a switch configuring a vLAG database by determining active and standby links, in accordance with an embodiment of the present invention.

FIG. 2B presents a flowchart illustrating a process of a switch configuring a vLAG database by determining active and standby links, in accordance with an embodiment of the present invention. The switch sorts all link entries in the vLAG database based on the port priority and the port identifier for each link (operation 252). For example, a link entry corresponding to a port with a higher priority (e.g., a lower numerical value based on the port priority and the port identifier) can be sorted to an earlier position in the vLAG database than a link entry corresponding to a port with a lower priority (e.g., a greater numerical value based on the port priority and the port identifier). Based on the sorted link entries and a predetermined number (e.g., the maximum number of allowed active links), the switch sets the status as "selected" or "standby" for each link entry (operation 254). The maximum number of allowed active links can be determined based on a user configuration, a software function, a hardware restriction, or a combination thereof. Thus, the switch marks a predetermined number of the sorted link entries to indicate an active link carrying traffic, and marks a remaining number of the sorted link entries to indicate a standby link for failover. Subsequently, the switch aggregates the locally "selected" links into a virtual link aggregation group (operation 256). Each of the other actor member switches configures its instance of the vLAG database in the same manner. The dynamic and synchronized operations described herein result in the selection of the same active and standby links.

Additionally, the switch can send a confirmation message to all other actor member switches indicating that the locally selected links of the switch are ready to operate in the vLAG (operation 258). The confirmation message is a reliable message with ensured delivery and can be a fabric-encapsulated message. For example, the confirmation message can be a TRILL-encapsulated message transmitted between RBridges in a TRILL network, or an IP-encapsulated message transmitted between layer-3 nodes in a layer-3 (e.g., IP) network.

FIG. 2C illustrates an exemplary vLAG database 140 maintained by a switch, corresponding to FIGS. 1A and 2A, in accordance with an embodiment of the present invention. vLAG database 140 can include entries for links in vLAG 130, and each entry can include a switch identifier 142, a port identifier 144, a port priority 146, a status 148, and an ACK flag 149. The values for switch identifier 142 can correspond to the values in table 150 of FIG. 1A for switches 101, 102, and 103, and the values for port identifier 144 can correspond to the values in table 160 of FIG. 1A for ports 131-136. The values for port priority 146 can be manually configured by a user, determined by the software, or set to a default value (e.g., 32768). The values for status 148 are determined by the switch that maintains vLAG 140 (e.g., switch 101) and performs the hot standby link algorithm as described herein. The values for ACK flag 149 can indicate whether an acknowledgment has been received by the switch that maintains vLAG database 140 from all other actor member switches (e.g., "ALL_NOT_ACK" or "ALL_ACK"). In some embodiments, ACK flag 149 is a bitmask that indicates whether the acknowledgment has been received. Note that ACK flag 149 is only used by the local switch that maintains this instance of the vLAG database. The value for ACK flag 149 of all other link entries in vLAG database 140 can be null or contain a default or reserved value (as indicated by an "X").

In FIG. 2C, vLAG database 140 reflects that the local switch (e.g., switch 101 with switch identifier 151) has determined port information for its local links (corresponding to port identifiers 161 and 163), added link entries corresponding to port identifiers 161 and 163, sent a port information message to each of the other actor member switches, and set its ACK flag for the corresponding local links to "ALL_NOT_ACK." The switch is in a "pending" state and has not yet determined the status of the links in the virtual aggregation group. In some embodiments, new link entries are added at the end of the database.

FIG. 2D illustrates an exemplary vLAG database 140 maintained by a switch, corresponding to FIGS. 1A and 2B, in accordance with an embodiment of the present invention. In FIG. 2D, vLAG database 140 reflects that local switch 101 has received an acknowledgment back from each of the other actor member switches and set its ACK flag for the corresponding local links to "ALL_ACK." The switch is now in a "ready" state and runs the HSL algorithm, which sorts the link entries based on the port identifier and the port priority and determines status 148 for each of the link entries in vLAG database 140. For example, if the maximum allowed number of active links is four, the switch marks the first four of the sorted link entries to indicate an active link carrying traffic (e.g., "selected") and marks the remaining two of the sorted link entries to indicate a standby link for failover (e.g., "standby").

Detecting An Unavailable Link; Selecting a Standby Link

Figure 3A:
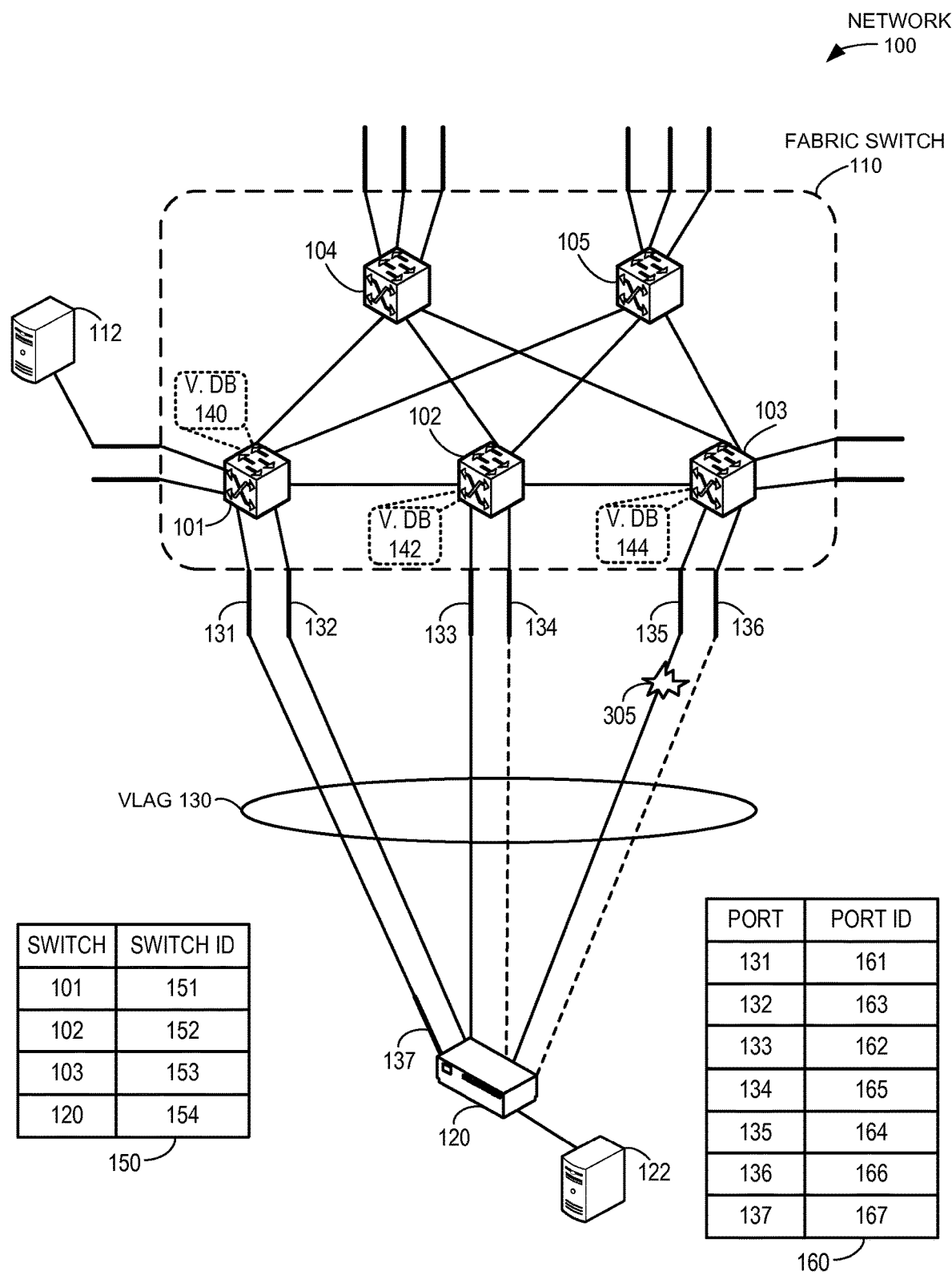
FIG. 3A illustrates an exemplary network that includes a switch capable of identifying the unavailability of an active local link and selecting a standby link, in accordance with an embodiment of the present invention.

FIG. 3A illustrates an exemplary network 100 that includes a switch capable of identifying the unavailability of an active local link and selecting a standby link, in accordance with an embodiment of the present invention. A respective actor member switch (e.g., switch 103) can detect unavailability 305 of an active link associated with a port that is local to the switch (e.g., port 135). Switch 103 can update its vLAG database 144 to indicate unavailability 305 (e.g., by removing the link entry for port 135 corresponding to port identifier 165 from its vLAG database 144) and send a link unavailability message to switches 101 and 102. Switch 103 can subsequently determine which standby link to set to a "selected" (e.g., active) state, based on its vLAG database 144. The HSL selection algorithm results in the selection of the link associated with port 134 to be set to an active state, as described below in relation to FIGS. 3B and 3C.

FIG. 3B illustrates an exemplary vLAG database 144 maintained by a switch, corresponding to the network depicted in FIG. 3A, in accordance with an embodiment of the present invention. In FIG. 3B, vLAG database 144 reflects the state before switch 103 detects that the link corresponding to port identifier 164 is unavailable. Note that vLAG database 144 is similar to vLAG database 140 depicted in FIG. 2D, where the sole difference is that vLAG database 144 has an ACK flag 149 value for its local link entries.

FIG. 3C illustrates an exemplary vLAG database 144 maintained by a switch, corresponding to the network depicted in FIG. 3A, in accordance with an embodiment of the present invention. In FIG. 3C, vLAG database 144 reflects that switch 103 has removed the link entry corresponding to the unavailable local port (corresponding to port identifier 164) and has selected the link corresponding to port identifier 165 as the hot standby link to update from "standby" to "selected" based on the port priority.

Figure 4:
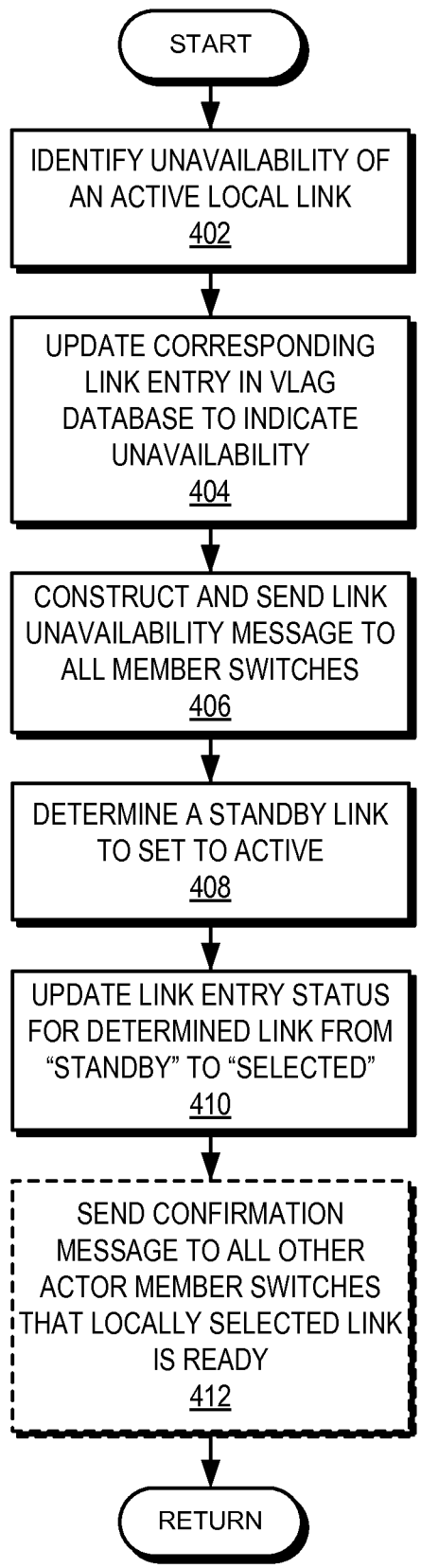
FIG. 4 presents a flowchart illustrating a process of a switch identifying the unavailability of an active local link and selecting a standby link, in accordance with an embodiment of the present invention.

FIG. 4 presents a flowchart illustrating a process of a switch identifying the unavailability of an active local link and selecting a standby link, in accordance with an embodiment of the present invention. During operation, a switch which is an actor member switch of a fabric switch identifies the unavailability of an active local link (e.g., a link associated with a port that is local to the switch) (operation 402). The unavailability can be a local port failure, a link failure, or a remote port failure (e.g., associated with a corresponding port on a remote device coupled to the switch). The switch updates the corresponding link entry in the vLAG database to indicate the link unavailability (operation 404). In some embodiments, the switch removes the corresponding link entry from the vLAG database. The switch constructs and sends a notification message with the link unavailability information ("link unavailability message") to all other actor member switches in the fabric switch (e.g., to all member switches participating in the vLAG) (operation 406). The link unavailability message is a reliable message with ensured delivery and can be a fabric-encapsulated message. For example, the link unavailability message can be a TRILL-encapsulated message transmitted between RBridges in a TRILL network, or an IP-encapsulated message transmitted between layer-3 nodes in a layer-3 (e.g., IP) network.

The switch determines a standby link to set to "selected" (e.g., active) based on the port priority (operation 408). For example, for a vLAG database that has been configured and sorted based on priority, the switch determines that the first listed "standby" link entry is the link to set to "selected." The switch then updates the status of the link entry for the determined link from "standby" to "selected" (operation 410). Additionally, if the newly selected link is a local link of the switch, the switch can send a confirmation message to all other actor member switches indicating that the newly selected local link is ready operate in the vLAG (operation 412).

Each of the other actor member switches receives the link unavailability message and also determines the same standby link entry to set to "selected" based on its own instance of the vLAG database. Because the same HSL selection algorithm is performed on synchronized versions of the vLAG database, the hot standby link selection occurs in a dynamic and consistent manner in the distributed architecture, thus ensuring an immediate and seamless failover to a hot standby link when an active link becomes unavailable.

Receiving a Port Information Message; Configuring the vLAG Database

Figure 5A:
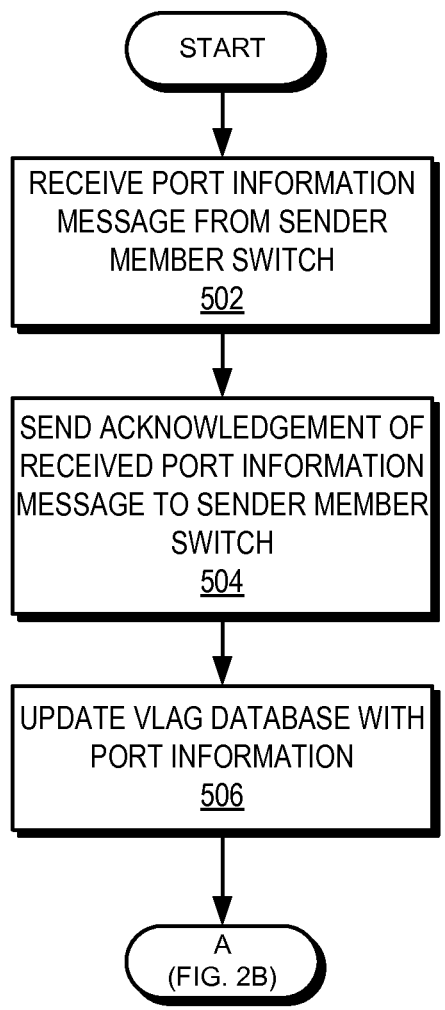
FIG. 5A presents a flowchart illustrating a process of a switch receiving a port information message and configuring its vLAG database, in accordance with an embodiment of the present invention.

FIG. 5A presents a flowchart illustrating a process of a switch receiving a port information message and configuring its vLAG database, in accordance with an embodiment of the present invention. During operation, a switch which is an actor member switch of a fabric switch receives a port information message from a sender member switch (operation 502). As described above, the port information message can contain a port identifier and a port priority associated with a link of a virtual link aggregation group. Upon receiving the port information message, the switch sends an acknowledgment of the received port information message to the sender member switch (operation 504). The switch updates its vLAG database for the corresponding link entry with the port information from the port information message (operation 506) and subsequently performs the HSL selection algorithm as described above at Label "A" of FIG. 2B. For example, the switch sorts the link entries in its vLAG database based on the port priority and the port identifier, sets the status of each link entry as "selected" or "standby" based on the sorted links and the maximum number of allowable links, and aggregates the "selected" links into a virtual link aggregation group. Additionally, the switch can send a confirmation message to all other actor member switches indicating that the locally selected links of the switch are ready to operate in the vLAG.

Receiving a Link Unavailability Message; Selecting a Standby Link

Figure 5B:
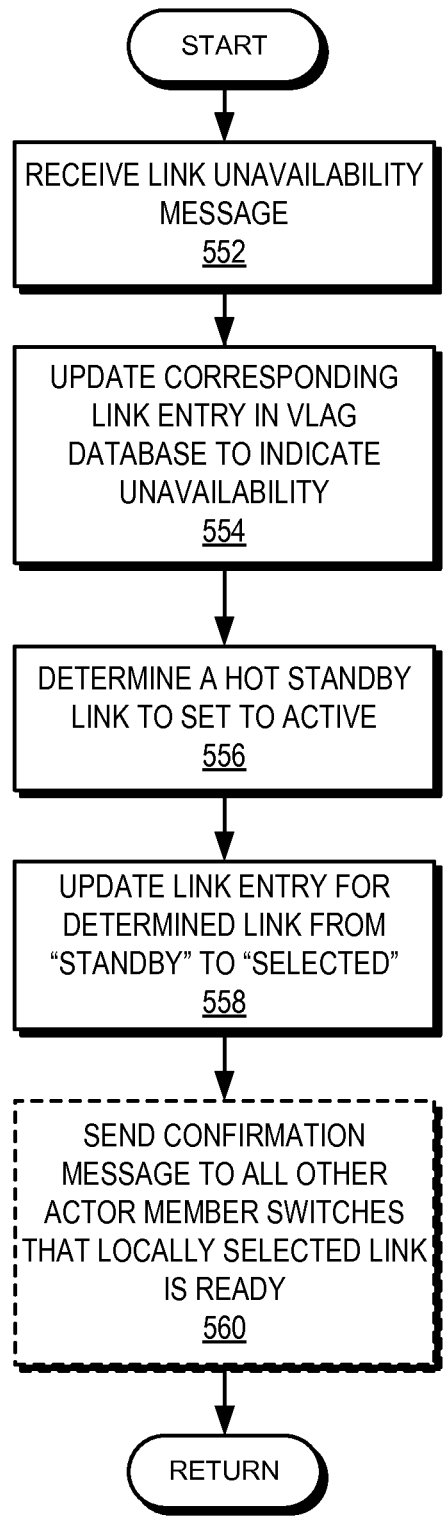
FIG. 5B presents a flowchart illustrating a process of a switch receiving a link unavailability message and selecting a standby link, in accordance with an embodiment of the present invention.

FIG. 5B presents a flowchart illustrating a process of a switch receiving a link unavailability message and selecting a standby link, in accordance with an embodiment of the present invention. During operation, a switch which is an actor member switch of a fabric switch receives a link unavailability message from a sender member switch (operation 552). As described above, the link unavailability can be a local port failure, a link failure, or a remote port failure (e.g., associated with a corresponding port on a remote device coupled to the switch). The switch updates the corresponding link entry in its vLAG database to indicate the link unavailability (operation 554). In some embodiments, the switch removes the corresponding link entry from the vLAG database. The switch then performs the HSL selection algorithm by determining a standby link to set to "selected" (e.g., active) based on the port priority (operation 556). For example, for a vLAG database that is configured and sorted based on port priority and port identifier, the switch determines that the first listed "standby" link is the link to set to "selected." The switch updates the status of the link entry for the determined link from "standby" to "selected" (operation 558). Additionally, if the newly selected link is a local link of the switch, the switch can send a confirmation message to all other actor member switches indicating that the newly selected local link is ready to operate in the vLAG (operation 560).

Data Packet Flow with a vLAG and a Virtual Switch

Figure 6:
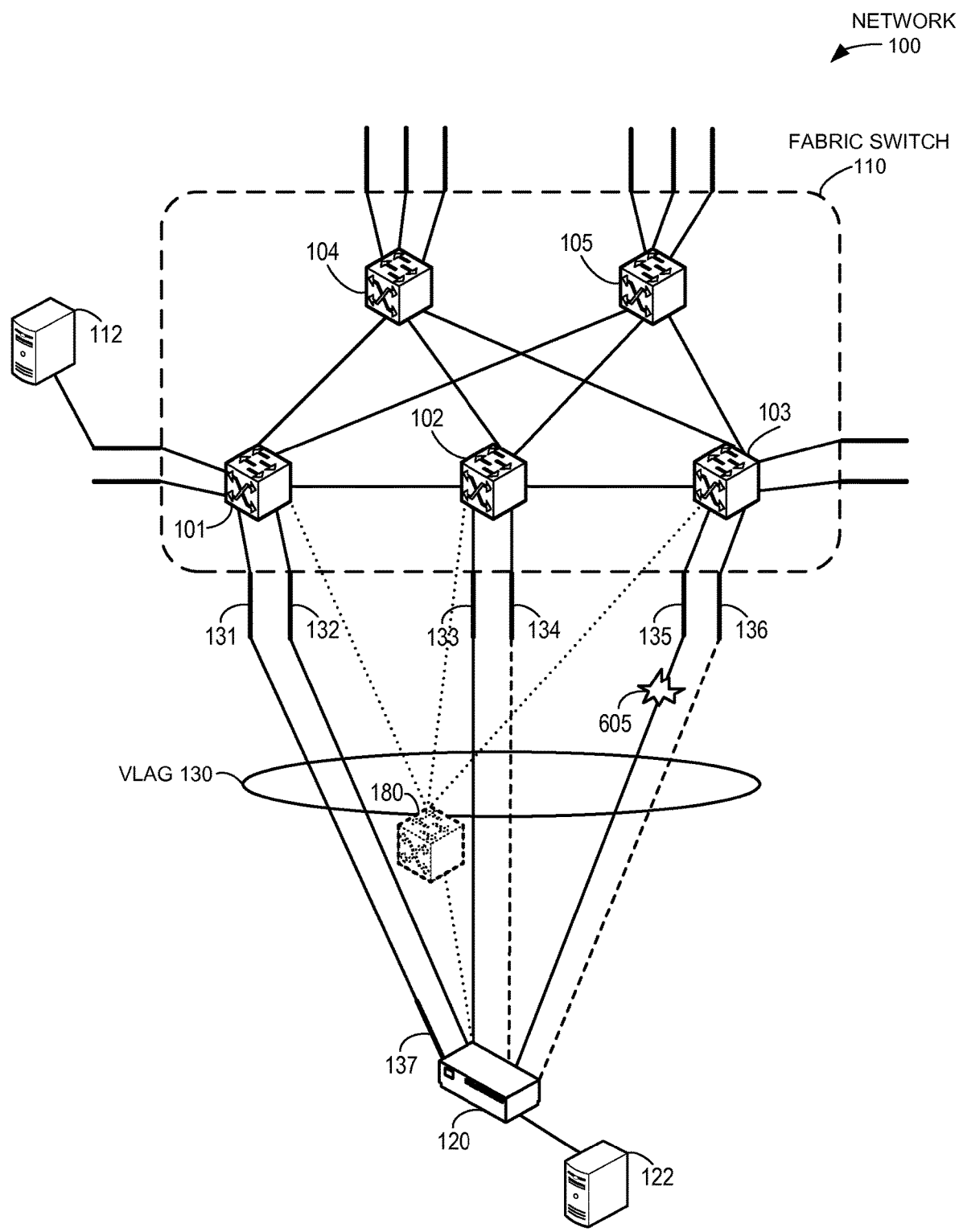
FIG. 6 illustrates an exemplary network that includes a switch capable of controlling active and standby links of a virtual link aggregation group, in accordance with an embodiment of the present invention.

FIG. 6 illustrates an exemplary network 100 that includes a switch capable of controlling active and standby links of a virtual link aggregation group, in accordance with an embodiment of the present invention. In FIG. 6, member switches 101, 102, and 103 are configured to operate in a special "trunked" mode for network device 120. Network device 120 views switches 101-103 as a common virtual switch 180, with a corresponding virtual switch identifier. Network device 120 is considered to be logically coupled to virtual switch 180 via logical links represented by dotted lines, and virtual switch 180 is considered to be logically coupled to switches 101-103 (also represented by dotted lines). Virtual switch 180 operates in conjunction with vLAG 130 to facilitate link aggregation. Virtual switches in link aggregation are described in U.S. Pat. No. 8,665,886, titled "Redundant Host Connection in a Routed Network," the disclosure of which is incorporated by reference herein.

If a member switch participating in a vLAG and logically coupled to a virtual switch determines that none of its local ports are actively carrying traffic, the member switch can remove its association with the virtual switch and the vLAG and broadcast a message of its removal to all other member switches. Upon receiving the message, the other member switches will no longer forward data destined for the virtual switch through the member switch. For example, if switch 103 identifies unavailability 605 associated with the link corresponding to its local port 135, switch 103 can determine that none of its local ports are actively carrying traffic (e.g., port 135 is in a down or unavailable state and port 136 is in a standby state). Switch 103 can send a fabric-wide message indicating its removal as a participant in the virtual link aggregation group (e.g., that it is no longer able to transmit packets destined to network device 120 via virtual switch 180). However, this can create an issue during the failover scenario of the present invention previously described in relation to FIGS. 3A-3C and 4. Switch 103 still has a local link available to carry traffic for vLAG 130 (e.g., the link corresponding to port 136, which is in a standby state) and therefore desires to remain in the virtual link aggregation group. Embodiments of the present invention solve this problem as described below in relation to FIGS. 7A and 7B.

Figure 7A:
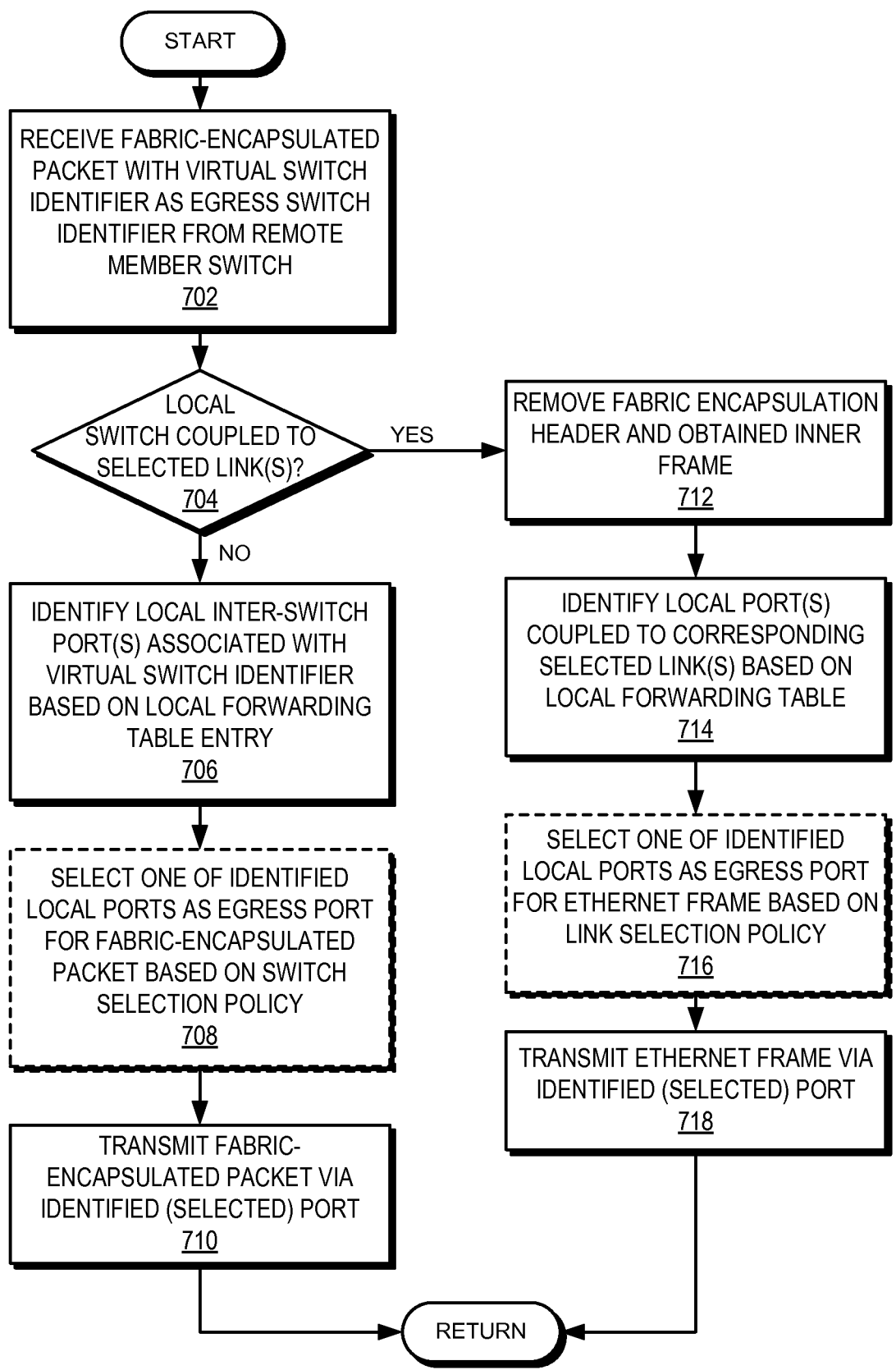
FIG. 7A presents a flowchart illustrating a process of a switch receiving a data packet from a remote member switch, in accordance with an embodiment of the present invention.

FIG. 7A presents a flowchart illustrating a process of a switch receiving a data packet from a remote member switch, in accordance with an embodiment of the present invention. During operation, the switch (e.g., the local switch) receives a fabric-encapsulated packet from a remote member switch where the egress switch identifier of the packet is the identifier of the virtual switch (operation 702). In some embodiments, the message is a TRILL-encapsulated message received from another RBridge in a TRILL network, and the virtual switch identifier is the RBridge ID of a virtual RBridge. In some embodiments, the message is an IP-encapsulated message received from a layer-3 node in a layer-3 (e.g., IP) network, and the virtual switch identifier is an IP address of a virtual layer-3 device. The switch determines if it is coupled to any selected links (decision 704). If it is not (e.g., none of its local ports are available to carry traffic), the switch identifies one or more local inter-switch ports associated with the virtual switch identifier based on a corresponding entry in its local forwarding table (operation 706). The forwarding table includes a mapping between the virtual switch identifier and the egress port. In some embodiments, if the switch identifies more than one local inter-switch port based on the forwarding table, the switch selects one of the identified local ports as the egress port for the fabric-encapsulated packet based on a switch selection policy (operation 708). Subsequently, the switch transmits the fabric-encapsulated packet via the identified (or selected) local inter-switch port (operation 710).

If the switch determines that it is coupled to any selected links (decision 704), the local switch removes the fabric-encapsulation header and obtains the inner frame (e.g., the Ethernet frame) (operation 712). The switch identifies a local port coupled to a corresponding selected link based on a corresponding entry in its local forwarding table (operation 714). In some embodiments, if the switch identifies more than one local port (e.g., more than one corresponding selected link) based on the forwarding table, the switch selects one of the identified local ports as the egress port for the Ethernet frame based on a link selection policy (operation 716). Subsequently, the switch transmits the Ethernet frame via the identified (or selected) local port (operation 718).

Figure 7B:
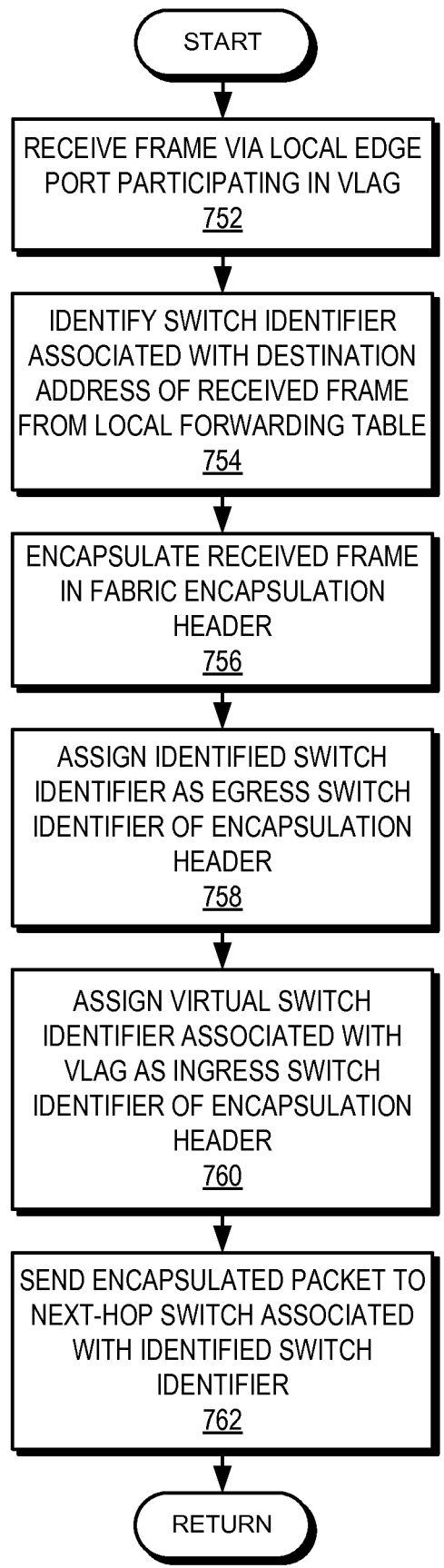
FIG. 7B presents a flowchart illustrating a process of a switch receiving a data packet from a network device coupled to the switch, in accordance with an embodiment of the present invention.

FIG. 7B presents a flowchart illustrating a process of a switch receiving a data packet from a network device coupled to the switch, in accordance with an embodiment of the present invention. During operation, the switch receives a frame via a local edge port that is participating in a virtual link aggregation group (operation 752). The switch identifies the switch identifier associated with the destination address of the received frame based on a corresponding entry in its local forwarding table (operation 754). The switch encapsulates the received frame in a fabric-encapsulation header (operation 756). The switch assigns the identified switch identifier as the egress switch identifier of the encapsulation header (operation 758). The switch also assigns the virtual switch identifier associated with the vLAG as the ingress switch identifier of the encapsulation header (operation 760). Subsequently, the switch sends the fabric-encapsulated packet to a next-hop switch associated with the identified switch identifier based on a routing table in the fabric switch (operation 762).

Exemplary Switch

Figure 8:
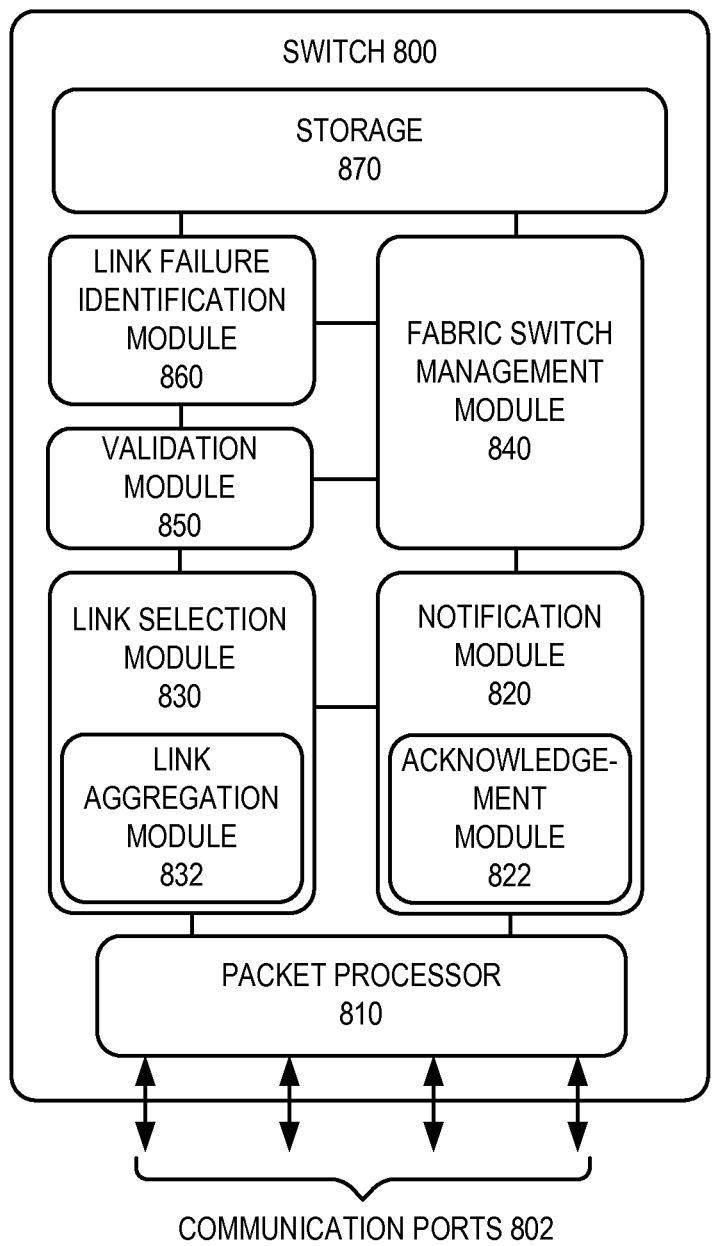
FIG. 8 illustrates an exemplary switch capable of establishing, monitoring, and controlling a virtual link aggregation group, in accordance with an embodiment of the present invention.

FIG. 8 illustrates an exemplary switch capable of establishing, monitoring, and controlling a virtual link aggregation group, in accordance with an embodiment of the present invention. In this example, a switch 800 includes a number of communication ports 802, a notification module 820, an acknowledgment module 822, a link selection module 830, a link aggregation module 832, a validation module 850, a link failure identification module 860, a packet processor 810 coupled to link selection module 830, and a storage 870. In some embodiments, switch 800 may maintain a membership in a fabric switch, wherein switch 800 also includes a fabric switch management module 840. Fabric switch management module 840 maintains a configuration database in storage 870 that maintains the configuration state of a respective switch within the fabric switch. Fabric switch management module 840 maintains the state of the fabric switch, which is used to join other switches. Under such a scenario, communication ports 802 can include inter-switch communication channels for communication within a fabric switch (e.g., notification messages between member switches). Communication ports 802 can also include communication channels for communication between the switch and an end device through an edge port (e.g., control messages relating to port information received by the switch from a network device). These communication channels can be implemented via a regular communication port and based on any open or proprietary format.

During operation, link selection module 830 operates to establish a virtual link aggregation group comprising a plurality of links coupling a network device to the switch and one or more other switches. Link selection module 830 also operates to sort the link entries in the data structure based on the port information of a respective link entry, mark a predetermined number of the sorted link entries to indicate an active link carrying traffic, and mark a remaining number of the sorted link entries to indicate a standby link for failover. Link selection module 830 further operates to: determine superior port information among respective port information of a local port and a remote port coupled to the local link based on respective system identifiers of the switch and the network device; and set the superior port information as the port information associated with the local link. Link selection module 830 further operates to, in response to determining that a port coupled to the local link is in a defaulted state, set the port information of the port as the port information associated with the local link.

Link failure identification module 860 operates to identify unavailability of an active link. Link selection module 830 further operates to remove a link entry comprising port information of the identified link, identify a link entry indicated as standby based on the port information in a respective link entry in the data structure, and mark the identified link entry to indicate an active link carrying traffic. Acknowledgment module 822 operates to identify an acknowledgment of a notification message from each of the one or more other switches. In response to identifying the acknowledgment from each of the one or more other switches, link selection module 830 operates to determine a state for the local link based on the port information. Notification module 820 operates to construct a notification message destined to each of the one or more other switches, indicating port information or unavailability of a local link. Validation module 850 operates to determine whether information associated with the network device is valid.

Note that the above-mentioned modules can be implemented in hardware as well as in software. In one embodiment, these modules can be embodied in computer-executable instructions stored in a memory which is coupled to one or more processors in switch 700. When executed, these instructions cause the processor(s) to perform the aforementioned functions.

The methods and processes described herein can be embodied as code and/or data, which can be stored in a computer-readable non-transitory storage medium. When a computer system reads and executes the code and/or data stored on the computer-readable non-transitory storage medium, the computer system performs the methods and processes embodied as data structures and code and stored within the medium.

The methods and processes described herein can be executed by and/or included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of embodiments of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A switch, comprising:
   one or more ports;
   link aggregation circuitry configured to store, in a data structure in a storage device of the switch, port information of ports participating in a virtual link aggregation group for a network device, which is reachable via the virtual link aggregation group from the switch and a second switch; and
   link selection circuitry configured to:
      sort the data structure based on the port information, wherein the port information of a port includes a port identifier and a port priority for the port; and
      determine a set of active ports and a set of standby ports from the ports participating in the virtual link aggregation group based on an order of the port information in the sorted data structure, wherein the set of active ports includes at least one port of the switch and at least one port of the second switch;
   forwarding circuitry configured to:
      decapsulate a header of a packet in response to identifying a virtual switch identifier associated with the virtual link aggregation group as a destination address of the header, and
      determine a part, which belongs to the set of active ports, from the one or more ports as an egress port far the packet; and
   notification circuitry configured to construct a notification message destined to the second switch, wherein the notification message indicates unavailability of a first port of the ports participating in the virtual link aggregation group due to failure of the first port,
   wherein the port information of a port of the switch maps the port priority, the port identifier of the port, and a switch identifier for the corresponding switch or the second switch to each other.

2. The switch of claim 1, wherein a respective entry of the data structure comprises port information of a port of the ports participating in the virtual link aggregation group.

3. The switch of claim 1, wherein, to determine the set of active ports and the set of standby ports, the link selection circuitry is further configured to:
mark a predetermined number of entries in the data structure to indicate the set of active ports corresponding to links carrying traffic; and
mark a remaining number of entries in the data structure to indicate the set of standby ports corresponding to links for failover.

4. The switch of claim 3, further comprising:
link failure identification circuitry configured to identify unavailability of an active port in the set of active ports;
wherein the link selection circuitry is further configured to:
remove a first entry comprising port information of the identified active port;
identify a second entry indicated as standby based on the port information of the second entry; and
mark the second entry to indicate an active link carrying traffic.

5. The switch of claim 1, wherein the switch and the second switch are members of a network of interconnected switches identified by a fabric identifier; and
wherein a switch identifier for a respective member switch of the network of interconnected switches is one or more of:
a Transparent Interconnection of Lots of Links (TRILL) routing bridge identifier;
an internet protocol (IP) address; and
a media access control (MAC) address.

6. The switch of claim 1, wherein the link selection circuitry is further configured to:
determine superior port information among respective port information of a first port of the switch and a corresponding second port of the network device; and
set the superior port information as the port information associated with the first port in the data structure.

7. The switch of claim 6, wherein the superior port information is determined based on a virtual media access control (MAC) address shared by the switch and the second switch and a MAC address of the network device, and wherein the virtual MAC address corresponds to the virtual switch identifier.

8. The switch of claim 6, wherein the link selection circuitry is further configured to:
in response to determining that the first port is in a defaulted state, set the port information of the first port as the port information associated with the first port in the data structure.

9. The switch of claim 1, further comprising:
a validation circuitry configured to determine whether information extracted from a control message received from the network device is valid, and wherein the control message includes a port priority and a port identifier of a port of the network device.

10. The switch of claim 1, wherein the virtual link aggregation group comprises one or more of:
an active link which carries traffic, wherein the active link corresponds to a port in the set of active ports; and
a standby link which remains standby for the active link, wherein the standby link corresponds to a port in the set of standby ports.

11. The switch of claim 1, wherein the notification message is sent to all member switches in the virtual link aggregation group.

12. A computer-implemented method, comprising:
storing, in a data structure in a storage device of a switch, port information of ports participating in a virtual link aggregation group for a network device, which is reachable via the virtual link aggregation group from the switch and a second switch, wherein the switch includes one or more ports;
sorting the data structure based on the port information, wherein the port information of a port includes a port identifier and a port priority for the port;
determining a set of active ports and a set of standby ports from the ports participating in the virtual link aggregation group based on an order of the port information in the sorted data structure, wherein the set of active ports includes at least one port of the switch and at least one port of the second switch;
decapsulating a header of a packet in response to identifying a virtual switch identifier associated with the virtual link aggregation group as a destination address of the header;
determining a port, which belongs to the set of active ports, from the one or more ports as an egress port for the packet; and
constructing a notification message destined to the second switch, wherein the notification message indicates unavailability of a first port of the ports participating in the virtual link aggregation group due to failure of the first ports,
wherein the port information of a port of the switch maps the port priority, the port identifier of the port, and a switch identifier for the corresponding switch or the second switch to each other.

13. The method of claim 12, wherein a respective entry of the data structure comprises port information of a port of the ports participating in the virtual link aggregation group.

14. The method of claim 12, determining the set of active ports and the set of standby ports includes:
marking a predetermined number of entries in the data structure to indicate the set of active ports corresponding to links carrying traffic; and
marking a remaining number of entries in the data structure to indicate the set of standby ports corresponding to links for failover.

15. The method of claim 14, further comprising:
identifying unavailability of an active port in the set of active ports;
removing a first entry comprising port information of the identified active port;
identifying a second entry indicated as standby based on the port information of the second entry; and
marking the second entry to indicate an active link carrying traffic.

16. The method of claim 12, wherein the switch and the second switch are members of a network of interconnected switches identified by a fabric identifier; and
wherein a switch identifier for a respective member switch of the network of interconnected switches is one or more of:
a Transparent Interconnection of Lots of Links (TRILL) routing bridge identifier;
an internet protocol (IP) address; and
a media access control (MAC) address.

17. The method of claim 12, further comprising:
  determining superior port information among respective port information of the first port of the switch and a corresponding second port of the network device; and
  setting the superior port information as the port information associated with the first port in the data structure.

18. The method of claim 17, wherein the superior port information is determined based on a virtual media access control (MAC) address shared by the switch and the second switch and a MAC address of the network device, and wherein the virtual MAC address corresponds to the virtual switch identifier.

19. The method of claim 17, further comprising:
  in response to determining that the first port is in a defaulted state, setting the port information of the first port as the port information associated with the first port in the data structure.

20. The method of claim 12, further comprising:
  determining whether information extracted from a control message received from the network device is valid, and wherein the control message includes a port priority and a port identifier of a port of the network device.

21. The method of claim 12, wherein the virtual link aggregation group comprises one or more of:
  an active link which carries traffic, wherein the active link corresponds to a port in the set of active ports; and
  a standby link which remains standby for the active link, wherein the standby link corresponds to a port in the set of standby ports.

22. A computer system for monitoring data flow, the system comprising:
  a storage device;
  one or more ports;
  processing circuitry; and
  the storage device coupled to the processing circuitry and storing instructions that when executed by a computer cause the computer to perform a method, the method comprising:
    storing, in a data structure in the storage device, port information ports participating in a virtual link aggregation group for a network device, which is reachable via the virtual link aggregation group from the computer system and a second computer system;
    sorting the data structure based on the port information, wherein the port information of a port includes a port identifier and a port priority for the port;
    determining a set of active ports and a set of standby ports from the ports participating in the virtual link aggregation group based on an order of the port information in the sorted data structure, wherein the set of active ports includes at least one port of the computer system and at least one port of the second computer system;
    decapsulating a header of a packet in response to identifying a virtual switch identifier associated with the virtual link aggregation group as a destination address of the header;
    determining a port, which belongs to the set of active ports, from the one or more ports as an egress port for the packet; and
    constructing a notification message destined to the second switch, wherein the notification message indicates unavailability of a first port of the ports participating in the virtual link aggregation group due to failure of the first port,
  wherein the port information of a port of the switch maps the port priority, the port identifier of the port, and a switch identifier for the corresponding switch or the second switch to each other.

* * * * *